US007602465B2

United States Patent
Kim et al.

(10) Patent No.: US 7,602,465 B2
(45) Date of Patent: Oct. 13, 2009

(54) IN-PLANE SWITCHING MODE LIQUID CRYSTAL DISPLAY DEVICE

(75) Inventors: Kyong Seok Kim, Kyonggi-do (KR); Young Wug Kim, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1017 days.

(21) Appl. No.: 10/695,396

(22) Filed: Oct. 29, 2003

(65) Prior Publication Data

US 2004/0085503 A1   May 6, 2004

(30) Foreign Application Priority Data

| Oct. 31, 2002 | (KR) | ...................... 10-2002-0067137 |
| Oct. 31, 2002 | (KR) | ...................... 10-2002-0067138 |
| Oct. 31, 2002 | (KR) | ...................... 10-2002-0067139 |

(51) Int. Cl.
*G02F 1/1343* (2006.01)
(52) U.S. Cl. ......................................... 349/141; 349/39
(58) Field of Classification Search .................... 349/38, 349/39, 141; 345/87–103
See application file for complete search history.

(56) References Cited

U.S. PATENT DOCUMENTS

| 5,285,301 A | * | 2/1994 | Shirahashi et al. .......... 349/143 |
| 6,005,542 A | * | 12/1999 | Yoon ............................ 345/92 |
| 6,300,926 B1 | * | 10/2001 | Yoneya et al. ................. 345/87 |
| 6,704,066 B2 | * | 3/2004 | Tsumura et al. ............... 349/42 |
| 6,909,415 B2 | * | 6/2005 | Kumagawa et al. ........... 345/92 |
| 6,963,335 B2 | * | 11/2005 | Tanaka et al. ................ 345/204 |
| 2002/0044246 A1 | * | 4/2002 | Moon et al. .................. 349/141 |

FOREIGN PATENT DOCUMENTS

| JP | 05134629 A * | 5/1993 |
| JP | 2002-303873 | 10/2002 |

* cited by examiner

*Primary Examiner*—David Nelms
*Assistant Examiner*—David Y Chung
(74) *Attorney, Agent, or Firm*—Morgan, Lewis & Bockius LLP

(57) ABSTRACT

An In-Plane switching mode LCD device includes a plurality of gate and data lines crossing each other to define a plurality of pixel regions, a plurality of thin film transistor (TFT) formed at crossing points of the gate and data lines to be alternately positioned along lower and upper side pixel regions adjacent to corresponding gate lines, a plurality of storage lines disposed in an offset configuration to be parallel with the gate lines along the TFT regions, a plurality of pixel electrodes within the pixel regions to be connected to drain electrodes of the TFTs, and a plurality of common electrodes disposed at fixed intervals from the pixel electrodes to be connected to the storage lines.

27 Claims, 21 Drawing Sheets data voltage for $V_{com}$ voltage of pixel data voltage for $V_{com}$ voltage of pixel

IN-PLANE SWITCHING MODE LIQUID CRYSTAL DISPLAY DEVICE

The present invention claims the benefit of the Korean Application Nos. P2002-67137, P2002-67138, and P2002-67139 all filed in Korea on Oct. 31, 2002, which are hereby incorporated by reference.

BACKGROUND OF THE INVENTION

1. Field of the Invention

The present invention relates to a liquid crystal display (LCD) device, and more particularly, to an In-Plane switching mode LCD device.

2. Discussion of the Related Art

As demands for various display devices increase, development of various flat-type display devices, such as liquid crystal display (LCD) devices, plasma display panel (PDP) devices, electroluminescent display (ELD) devices, and vacuum fluorescent display (VFD) devices, has increased. Among the various flat-type display devices, the LCD devices have been commonly used because of their thin profile, lightweight, and low power consumption. Specifically, the LCD devices have been developed as substitutes for Cathode Ray Tube (CRT) devices that are used in computer monitors and television displays. In addition, mobile-type LCD devices have been developed for use in notebook computers.

Key developments will rely upon whether the LCD devices can implement a high quality picture, such as high resolution and high luminance, in large-sized displays while still maintaining their lightweight, thin profile, and low power consumption. Accordingly, active matrix-type LCD devices have been developed because of their high resolution and image quality, wherein thin film transistors and pixel electrodes are arranged in a matrix-type configuration.

In general, LCD devices include an LCD panel for displaying an image and a driver for supplying a driving signal to the LCD panel. In addition, the LCD panel includes first and second substrates bonded to each other having a cell gap formed therebetween and a liquid crystal material layer disposed within the cell gap. The first substrate (i.e., TFT array substrate) includes a plurality of gate lines arranged along a first direction at fixed intervals, a plurality of data lines arranged along a second direction perpendicular to the first direction at fixed intervals, a plurality of pixel electrodes arranged in a matrix-type configuration within pixel regions defined by crossing of the gate and data lines, and a plurality of thin film transistors enabled according to signals supplied to the gate lines for transmitting signals from the data lines to the pixel electrodes. The second substrate (i.e., color filter array substrate) includes a black matrix layer that prevents light from portions of the first substrate except at the pixel regions, an RGB color filter layer for displaying various colors, and a common electrode, which together with the pixel electrode, induces an electric field to the liquid crystal material layer for producing the image.

The cell gap is maintained between the first and second substrates by spacers, and the first and second substrates are bonded together by a sealant material having a liquid crystal injection inlet, wherein the liquid crystal material is injected between the first and second substrates through the liquid crystal injection inlet. Initially, the cell gap between the bonded first and second substrates is maintained in a vacuum state, and the liquid crystal injection inlet is dipped into a container filed with the liquid crystal material. Accordingly, the liquid crystal material is injected into the cell gap between the first and second substrates using capillary action. After injection of the liquid crystal material into the cell gap has been completed, the liquid crystal injection inlet is sealed by the sealant material.

In general, the LCD device is driven according to optical anisotropy and polarizing characteristics of the liquid crystal material. An alignment direction of liquid crystal molecules of the liquid crystal material is controlled by the induced electric field to the liquid crystal material. Accordingly, light irradiated through the liquid crystal material may be controlled by the alignment direction of the liquid crystal molecules. If the pixel electrode is formed on the first substrate and the common electrode is formed on the second substrate, the liquid crystal material is driven by the electric field that is perpendicular to the first and second substrates. Thus, it is difficult to obtain a wide viewing angle. However, In-Plane switching mode LCD devices drive the liquid crystal material using an In-Plane mode electric field, thereby providing wide viewing angles. For example, along a front direction of the In-Plane switching mode LCD device, a viewer can have a viewing angle of 70° in all directions (i.e., lower, upper, left, and right directions). Compared to general TN mode LCD devices, In-Plane switching mode LCD devices have simplified fabrication process steps, and reduced color shift.

FIG. 1 is a cross sectional view of an In-Plane switching mode LCD device according to the related art. In FIG. 1, an In-Plane switching mode LCD device includes first and second substrates 1 and 2 being opposite to each other, and a liquid crystal material layer 3 disposed between the first and second substrates 1 and 2. A thin film transistor (TFT) array is formed on the first substrate 1 in a matrix-type configuration. Although not shown, a drain electrode of the thin film transistor is connected to a pixel electrode 20, and a common electrode 30 is formed spaced apart from the pixel electrode 20. In addition, the second substrate 2 includes a black matrix layer (not shown) that prevents light from portions of the first substrate 1 except with pixel regions, and a color filter layer for displaying various colors. In the In-Plane switching mode LCD device, the pixel electrode 20 and the common electrode 30 are formed along the same plane, whereby the liquid crystal material is driven by an induced In-Plane mode electric field.

A method for driving the In-Plane switching mode LCD device includes supplying a scanning signal to the gate line and supplying a video signal to the pixel corresponding to the gate line receiving the scanning signal. The liquid crystal material injected between the first and second substrates 1 and 2 may deteriorate when a DC voltage is applied for an extended period of time. In order to prevent such a problem, a polarity of the supplied voltage is cyclically changed, which is commonly referred to as a polarity inversion method. The polarity inversion method is classified into one of a frame inversion method, a line inversion method, a column inversion method, and a dot inversion method.

In the frame inversion method, positive and negative polarities of a data voltage supplied to the liquid crystal material for a common electrode voltage are alternately supplied during each frame. For example, if a positive (+) polarity data voltage is supplied to an even frame, a negative (−) polarity data voltage is supplied to an odd frame. Thus, the same polarity data voltage is supplied according to the even or odd frame, thereby decreasing consumption current during a switching mode. However, the frame inversion method is sensitive to flicker generated according to an asymmetrical transmittance between the positive and negative polarities. In addition, the frame inversion method is susceptible to crosstalk caused by interference between data signals of adjacent pixels.

The line inversion method is commonly used for low-resolution devices (i.e., VGA and SVGA devices), in which a data voltage is supplied such that a polarity of a data voltage supplied to the liquid crystal material for a common electrode voltage is changed according to a vertical direction. For example, in a first frame, a positive (+) polarity data voltage is supplied to an odd gate line, and a negative (−) polarity data voltage is supplied to an even gate line. Next, in a second frame, the negative (−) polarity data voltage is supplied to the odd gate line, and a positive (+) polarity data voltage is supplied to the even gate line. In the line inversion method, the polarities of the data voltage are oppositely supplied to adjacent lines such that a luminance difference is offset between the lines according to spatial averaging, thereby preventing the flicker during frame inversion. For example, the opposite-polarity data voltages are supplied along a vertical direction, whereby a coupling phenomenon of the data signals is offset, thereby decreasing vertical crosstalk during the frame inversion. However, the polarity of the data voltage is the same along a horizontal direction, so that horizontal crosstalk is generated, and consumption current is increased due to an increase of the number of switching operations, as compared with that during the frame inversion.

In the column inversion method, the same polarity of a data voltage supplied to liquid crystal material for a common electrode voltage is supplied in the vertical direction, and positive and negative polarities of the data voltage are alternately supplied along the horizontal direction. Thus, it is possible to minimize flicker by spatial averaging and to minimize horizontal crosstalk. However, the column inversion method requires a high-voltage column drive IC since the opposite-polarity data voltages are supplied to the adjacent lines according to the vertical direction.

The dot inversion method is supplied to high-resolution devices (i.e., XGA, SXGA, and UXGA device) for obtaining the greatest quality picture image. In the dot inversion method, a polarity of a data voltage is differently supplied to all-direction adjacent pixels. Accordingly, it is possible to minimize flicker by spatial averaging. However, the dot inversion method is problematic since the dot inversion method has a high consumption current by using a high-voltage source driver.

FIG. 2 is a plan view of a pixel structure of an In-Plane switching mode LCD device according to the related art. In FIG. 2, an In-Plane switching mode LCD device includes a plurality of gate and data lines 40 and 50 crossing each other to define a plurality of pixel regions, a plurality of storage lines 60 spaced apart from the plurality of gate lines 40, a plurality of thin film transistors (TFT) each disposed at crossing regions of the plurality of gate and data lines 40 and 50, a plurality of pixel electrodes 20 arranged as a "1-shaped" region within pixel regions 20 in parallel with the data lines, and a common electrode 30 formed as an "inverted U-shaped" region within a circumference of the pixel region.

FIG. 3 is a cross sectional view along I-I' of FIG. 2 according to the related art, and FIG. 4 is a cross sectional view along II-II' of FIG. 2 according to the related art.

In FIG. 2, a metal layer is deposited on an entire surface of a substrate 10 (in FIGS. 3 and 4), and then selectively removed, thereby forming a gate line 40 having a gate electrode (not shown) disposed along a horizontal direction, and a storage line 60 disposed along the same direction as the gate line 40 and spaced apart by a predetermined interval from the gate line 40. Then, a gate insulating layer 25 (in FIGS. 3 and 4) is formed on an entire surface of the substrate 10 including the gate line 40 and the storage line 60. Subsequently, a semiconductor layer (not shown) is formed on the gate insulating layer 25 above the gate electrode to serve as an active layer of a thin film transistor. Next, in FIGS. 3 and 4, a metal layer is deposited on the substrate 10 including the gate insulating layer 25 and the semiconductor layer, and then selectively removed to form a data line 50 perpendicular to the gate line 40 and source/drain electrodes 50c. Accordingly, the thin film transistor (TFT) comprising the gate electrode (not shown), the semiconductor layer (not shown), and the source/drain electrodes 50c are formed on the substrate 10.

In FIGS. 3 and 4, a passivation layer 35 is formed on an entire surface of the substrate 10 including the data line 50, and contact holes are formed in the passivation layer 35 corresponding to the drain electrode 50c of the TFT and the storage line 60. Then, a metal layer is deposited on an entire surface of the passivation layer 35, and patterned to form a pixel electrode 20 connected to the drain electrode 50c of the TFT, and a common electrode 30 connected to the storage line 60 spaced apart from the pixel electrode 20. Accordingly, the common electrode 30 contacts the storage line 60 formed under the common electrode 30 to provide power to the common electrode 30, and a data voltage is supplied to the pixel electrode 20 according to a conductive state of the TFT. In addition, the storage lines 60 are connected to one another and the same common voltage signal Vcom is applied to the storage lines 60, wherein the common voltage signal Vcom is DC voltage.

FIG. 5 is a schematic circuit diagram of the pixel structure of FIG. 2 according to the related art. In FIG. 5, in a unit pixel of the In-Plane switching mode LCD device of FIG. 2, a storage capacitor Cst is formed between the storage line 60 and the drain electrode 50c of the TFT formed between the gate and data lines 40 and 50. Then, a liquid crystal capacitor $C_{LC}$ is formed between the pixel electrode 20 and the common electrode 30, and the storage capacitor Cst is connected to the liquid crystal capacitor $C_{LC}$ in parallel.

As shown in FIG. 6, the common voltage Vcom signal is maintained at a constant level even though the signal voltage of the pixel or the gate line 40 is changed, or the frame is changed. At this time, the polarity of the data voltage is inversely applied to the respective pixels in the horizontal direction. That is, the data voltage is applied such that positive (+) and negative (−) polarities for the Vcom are inversely applied to the respective pixels by alternately applying the positive (+) and negative (−) polarity data voltages to the data lines crossing the gate lines. The common voltage Vcom is maintained at a level between the positive (+) and negative (−) polarity data voltages applied to the pixel electrode 20. At this time, the same polarity of the data voltage is applied to respective odd data lines, or respective even data lines.

In order to drive the corresponding pixel, a gate driver (not shown) applies a select pulse through the gate line, and a source driver (not shown) applies a video signal to the thin film transistor turned on by a signal line. On applying the data voltage by the turned-on thin film transistor, the liquid crystal capacitor $C_{LC}$ and the storage capacitor Cst formed between the drain electrode of the thin film transistor and the storage line are charged during turning-on the thin film transistor. After turning-off the thin film transistor, electric charges are maintained until the thin film transistor is turned-on.

FIG. 6 is a timing diagram of a pixel voltage compared to a voltage signal supplied to gate and storage lines according to the related art. In FIG. 6, a pixel voltage (dark line) is changed by a difference amount (arrow) according to a parasitic capacitor formed between the gate and source electrodes of the thin film transistor along a falling edge of the scanning signal supplied to the gate line, whereby an alignment direction of the liquid crystal material is induced by the difference amount.

FIG. 7 is a polarity change diagram of common voltages in pixel regions according to odd/even frames of an In-Plane switching mode LCD device according to the related art. In FIG. 7, when an In-Plane switching mode LCD device uses the dot inversion method, polarity (i.e., data voltage for common voltage) is inversely supplied to adjacent pixels, whereby the polarities of the adjacent pixels are opposite to each other. Whenever the frame is changed, the polarity of the pixel is inverted. For example, the polarity of the pixel is alternately changed to a positive (+) and negative (−) to be different from the polarity of the adjacent pixel, thereby obtaining high-quality picture images.

FIG. 8 is a block diagram of a gate driver of an In-Plane switching mode LCD device according to the related art. In FIG. 8, a gate driver of an In-Plane switching mode LCD device includes a shift register part 61, a level shifter 62, and a buffer 63. The shift register part 61 includes a plurality of shift registers receiving a Gate Start Pulse signal GSP, a Gate Shift Clock signal GSC, and a Left/Right select signal L/R from a processor (i.e., computer), whereby the plurality of shift registers are sequentially operated. In addition, the level shifter 62 receives a Gate Output Enable signal (GOE) from the processor for sequentially shifting signals output from the shift register part 61, and the buffer 63 outputs signals for the gate lines Gout1, Gout2, . . . , Goutn that are supplied to the gate lines as a state selected from VGH, VGL, VCC, and VSS levels.

FIG. 9 is a diagram of a gate driver structure and a timing sequence of an In-Plane switching mode LCD device according to the related art. In FIG. 9, during operation of a gate driver the shift register part 61 shifts the GSP signal by the GSC signal, thereby sequentially enabling the gate lines. After completing enabling of the gate lines during one frame, a carry value is carried so that the gate lines of a second frame are enabled. Subsequently, the level shifter 62 sequentially level-shifts the signals supplied to the gate lines, and outputs the level-shifted signals to the buffer 63. Accordingly, the plurality of gate lines connected to the buffer 63 are sequentially enabled. In addition, a predetermined gate line synchronized by the GSC signal is maintained at the VGH level, and then the predetermined gate line is maintained at the VGL level along a rising edge of the GOE signal.

FIG. 10 is a block diagram of a source driver of an In-Plane switching mode LCD device according to the related art. In FIG. 10, a source driver of an In-Plane switching mode LCD device includes a shift register 81, first and second latch parts 82 and 83, a decoder 84, and an output buffer 85. The shift register 81 receives a Source Start Pulse signal (SSP), a Source Shift Clock signal (SSC), and a Left/Right select signal (L/R) from a processor, and stores the signals according to addresses. In addition, the first and second latch parts 82 and 83 receive a Load signal from the processor to receive and store RGB Data signals for even/odd modes in corresponding addresses. The decoder DAC 84 converts digital signals stored in the first and second latch parts 82 and 83 into analog signals, and the output buffer 85 outputs the signals of the decoder 84 according to the corresponding data lines.

Operation of the source driver includes sequentially receiving of the RGB Data signal from the processor through the shift register 81 in a dot clock, and latching by the first and second latch parts 82 and 83, thereby changing a timing system of Dot at a Time Scanning to a timing system of Line at a Time Scanning. Then, the data signals stored in the first latch part 82 are transmitted to the second latch part 83 according to horizontal clocks. The data signals stored in the second latch part 83 are transmitted to the decoder DAC 84. Then, the decoder DAC 84 receives a gamma standard voltage, and responds to a Polarity Out Load signal (POL) supplied from the processor, whereby the digital data is converted into an analog voltage, and then the analog voltage is output. The analog voltage is supplied to the data lines through the output buffer 85 according to a control signal supplied from the analog power source and the processor.

FIG. 11 is a gamma standard voltage circuit establishing a gamma standard voltage and a data voltage output extent of a source driver using the gamma standard voltage circuit according to the related art. In FIG. 11, in order to obtain a 256 gray level scale, a source driver of an In-Plane switching mode LCD device forms 256 gray level voltages for positive (+) fields and 256 gray level voltages for negative (−) fields using one gamma voltage driving circuit. After setting a maximum standard voltage value for the positive (+) fields, and a minimum standard voltage value for the negative (−) fields using an R-string method, the gamma standard voltage value is output at a level between the maximum standard voltage value for the positive (+) fields and the minimum standard voltage value for the negative (−) fields. Then, the DAC 84 receives the gamma standard voltage value, and the source driver is operated. In case of the positive (+) fields for the common voltage Vcom, the source driver outputs the data voltage having a larger value than that of the common voltage Vcom. Meanwhile, in case of the negative (−) fields for the common voltage Vcom, the source driver outputs the data voltage having a smaller value than that of the common voltage Vcom.

A method for driving the In-Plane switching mode LCD device having the aforementioned gate and source drivers includes the source driver (in FIGS. 10 and 11) sequentially receiving video data signals of the respective pixels supplied from the processor, and stores the video data signals corresponding to the respective data lines. Then, the gate driver (in FIGS. 8 and 9) sequentially supplies the scanning signals to the plurality of gate lines by outputting the Gate Shift Clock signal (GSC), the Gate Shift Pulse signal (GSC), and the Gate Output Enable signal (GOE). Accordingly, the plurality of thin film transistors connected to the selected gate line are turned ON, whereby the video data signals (i.e., data voltage type) output from the source driver are supplied to the drain electrode of the thin film transistor, thereby displaying the video data on an LCD display panel. Next, the aforementioned process steps are repetitively performed, thereby displaying the video data on the LCD display panel. Accordingly, a plurality of pins from 1 to n are sequentially formed at an output side of a gate driver Tape Carrier Package (TCP) to output signals for the gate lines.

However, the related art In-Plane switching mode LCD device has the following disadvantages. When driving the In-Plane switching mode LCD device using the dot inversion method, a constant value is supplied to the common voltage signal in a DC state, and the positive (+) and negative (−) polarity data voltages for the common voltage signal are alternately supplied to the data lines of the respective pixels. Accordingly, the pixel voltage supplied to the liquid crystal has the polarity dependent on the data voltage, so that it is required to use the source driver having a great output voltage difference to induce a high voltage to the liquid crystal material. The source driver of the In-Plane switching mode LCD device generally has an extended output using a constant voltage $V_{DD}$ power source of 15V. Accordingly, the pixel voltage supplied to the liquid crystal material is about (−)6V or (+)6V. However, since the source driver having the high output value is expensive, low power consumption has been developed by lowering the output value to decrease manufacturing costs.

In the In-Plane switching mode LCD device, the liquid crystal material is driven according to a fringe field formed between the pixel electrode and the common electrode. Accordingly, it is required to form the fringe field having a great value by narrowing an interval between the pixel electrode and the common electrode. In order to narrow the interval between the pixel electrode and the common electrode, it is necessary to pattern the pixel and common electrodes having a finger-type crossing at a predetermined interval when patterning the pixel and common electrodes. However, although it is possible to narrow the interval between the pixel electrode and the common electrode, an aperture ratio of the pixel is deteriorated.

To improve the aperture ratio, the pixel or common electrode may be formed of a transparent material, such as ITO. However, patterns having various shapes are formed within the pixel region so that it is difficult to uniformly transmit the light. When widening the interval between the pixel electrode and the common electrode for improving the aperture ratio, the In-Plane mode electric field formed between the pixel electrode and the common electrode decreases. Thus, in order to obtain the required luminance, the output of the data voltage must be extended.

SUMMARY OF THE INVENTION

Accordingly, the present invention is directed to an In-Plane switching mode LCD device and a method of fabricating an In-Plane switching mode LCD device that substantially obviates one or more problems due to limitations and disadvantages of the related art.

An object of the present invention is to provide an In-Plane switching mode LCD device using a dot inversion method for obtaining low power consumption.

Another object of the present invention is to provide an In-Plane switching mode LCD device having a reduced data voltage output.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, an In-Plane switching mode LCD device includes a plurality of gate and data lines crossing each other to define a plurality of pixel regions, a plurality of thin film transistors (TFTs) formed at crossing points of the gate and data lines to be alternately positioned along lower and upper side pixel regions adjacent to corresponding gate lines, a plurality of storage lines disposed to be parallel with the gate lines along the TFTs, each storage line being separated, a plurality of pixel electrodes within the pixel regions to be connected to drain electrodes of the TFTs, and a plurality of common electrodes disposed at fixed intervals from the pixel electrodes to be connected to the storage lines.

In another aspect, an In-Plane switching mode LCD device includes a plurality of gate and data lines crossing each other to define a plurality of pixel regions, a plurality of storage lines formed between the gate lines, the storage lines to which first and second common voltages are alternately supplied, a plurality of first thin film transistors connected to odd-numbered gate lines and even-numbered data lines, a plurality of second thin film transistors connected to the even-numbered gate lines and the odd-numbered data lines, a plurality of pixel electrodes in the pixel regions to be connected to drain electrodes of one of the first thin film transistors and the second thin film transistors, and a plurality of common electrodes in the pixel regions at fixed intervals from the pixel electrodes to be connected to the storage lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
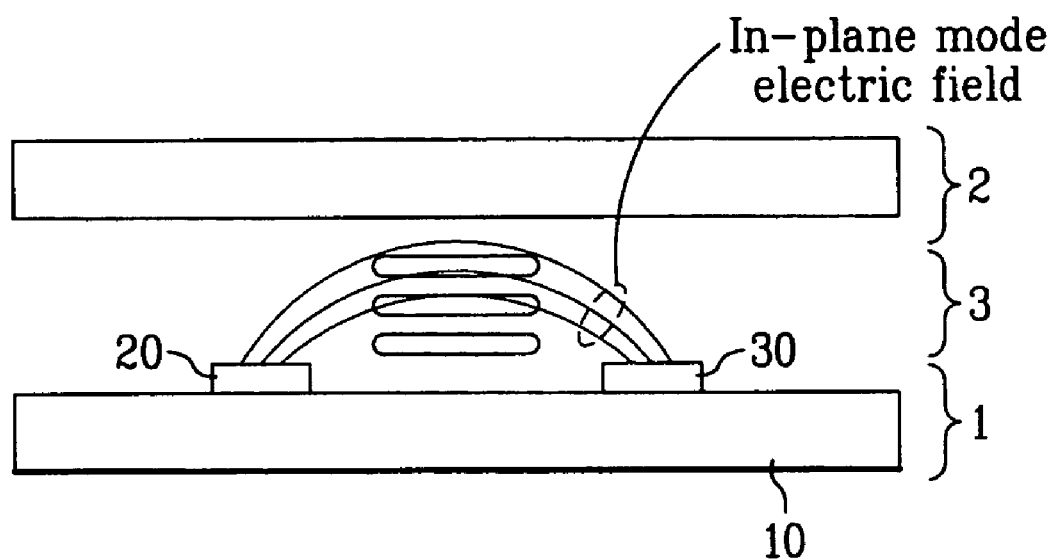
FIG. 1 is a cross sectional view of an In-Plane switching mode LCD device according to the related art.
Figure 2:
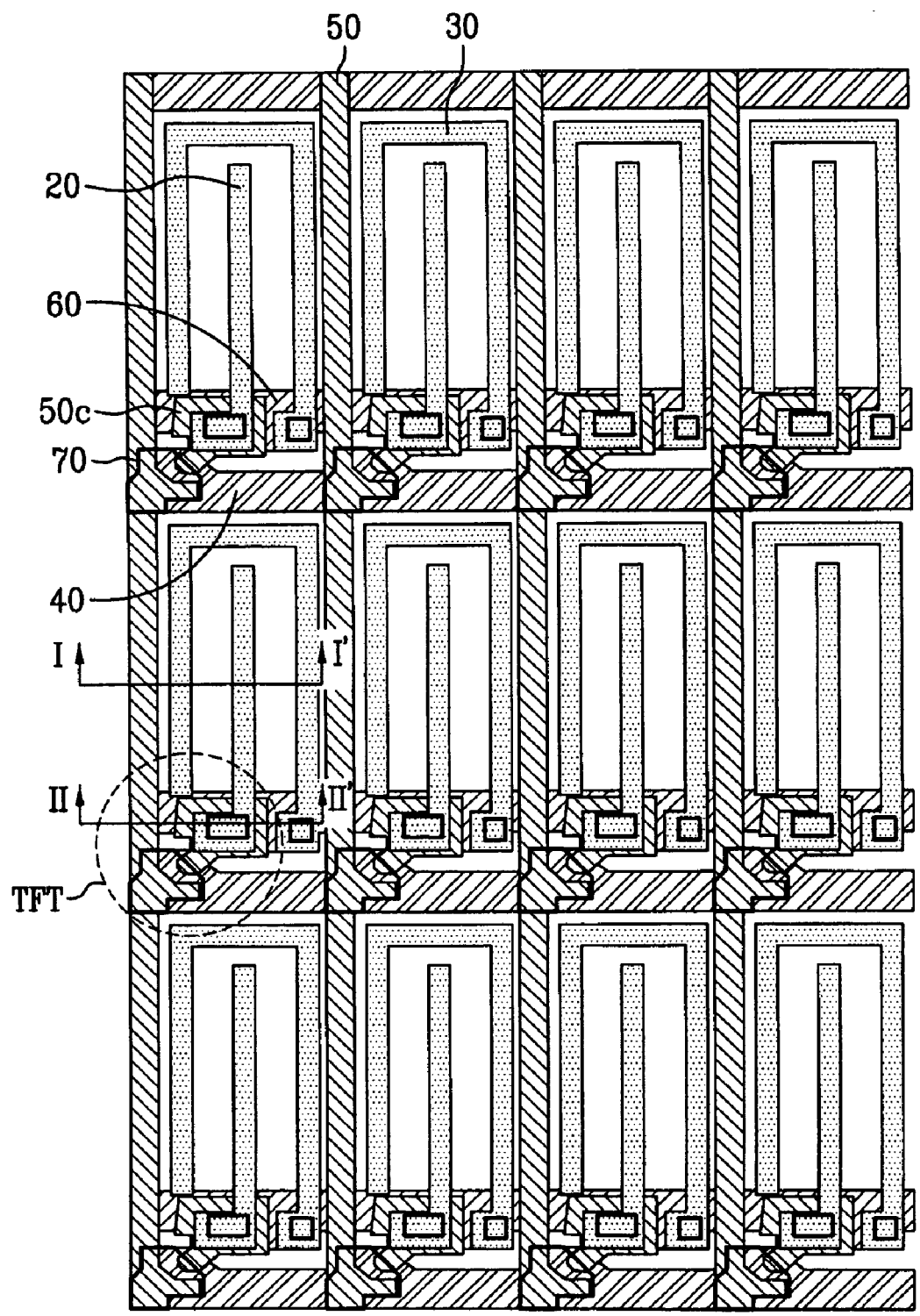
FIG. 2 is a plan view of a pixel structure of an In-Plane switching mode LCD device according to the related art.
Figure 3:
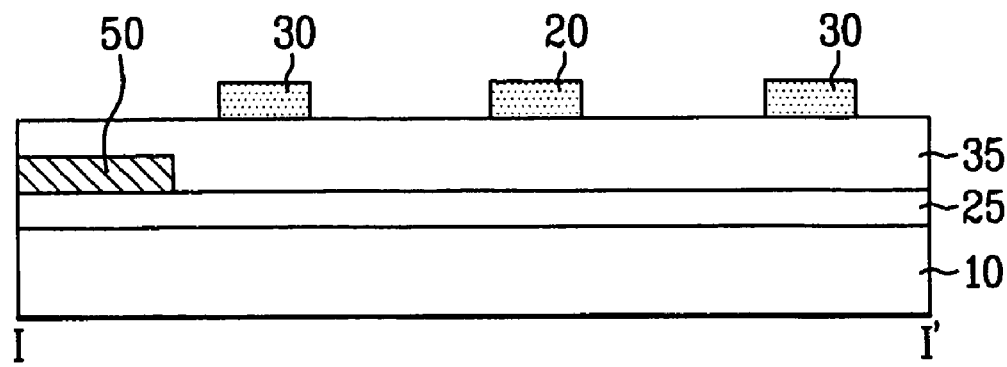
FIG. 3 is a cross sectional view along I-I' of FIG. 2 according to the related art.
Figure 4:
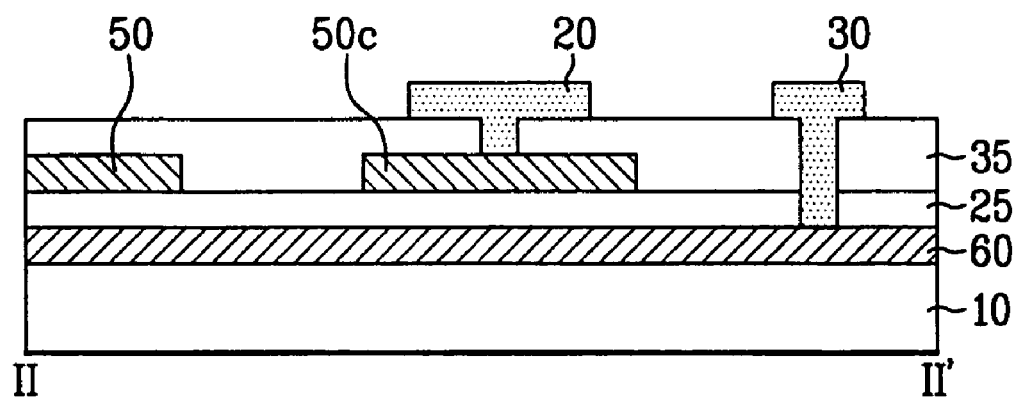
FIG. 4 is a cross sectional view along II-II' of FIG. 2 according to the related art.
Figure 5:
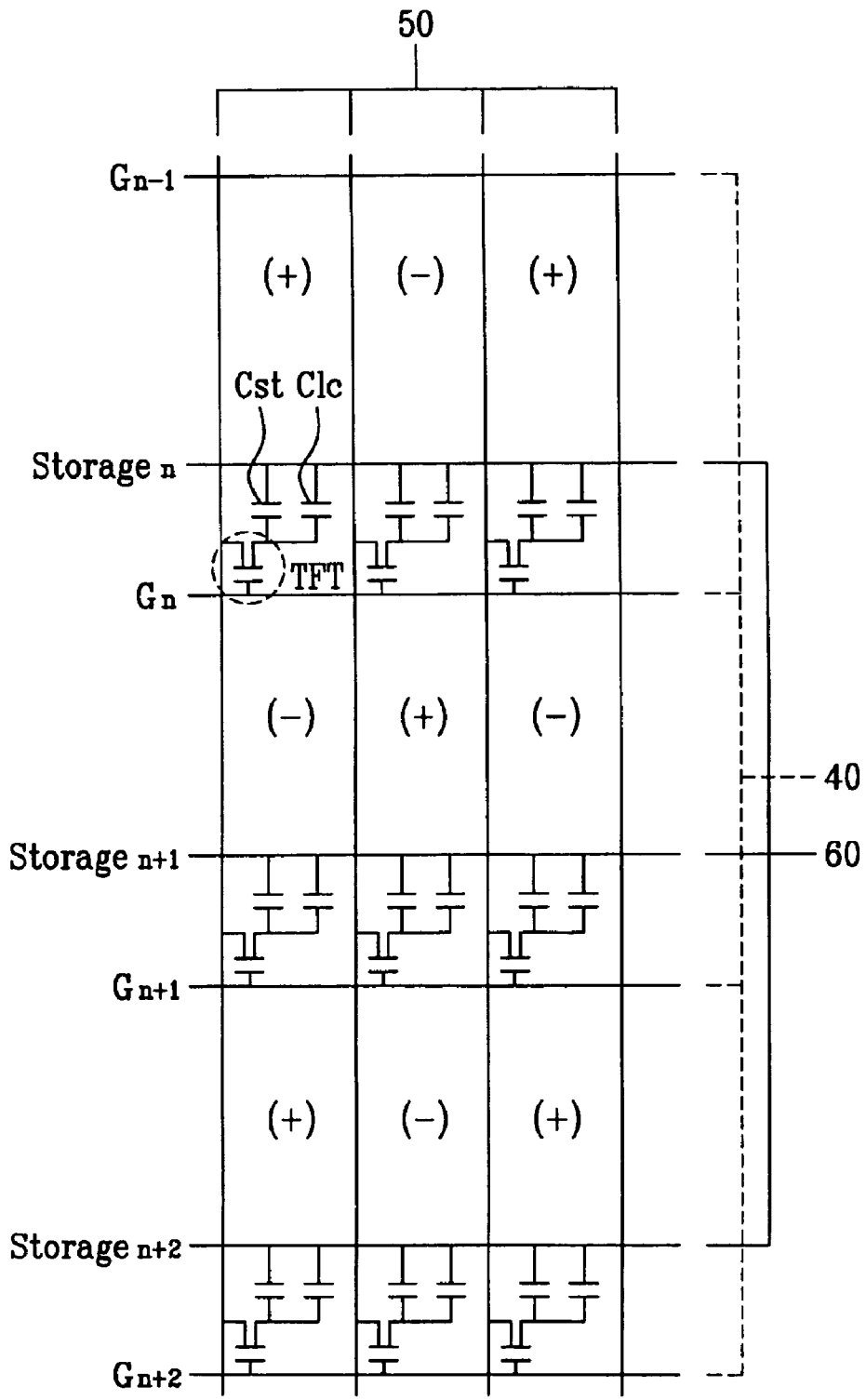
FIG. 5 is a schematic circuit diagram of the pixel structure of FIG. 2 according to the related art.
Figure 6:
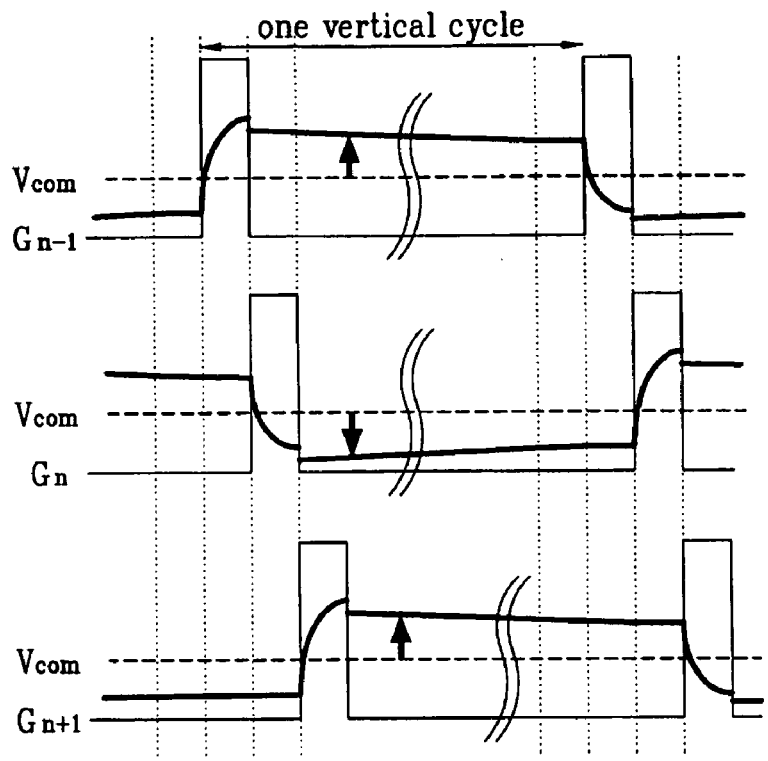
FIG. 6 is a timing diagram of a pixel voltage compared to a voltage signal supplied to gate and storage lines according to the related art.
Figure 7:
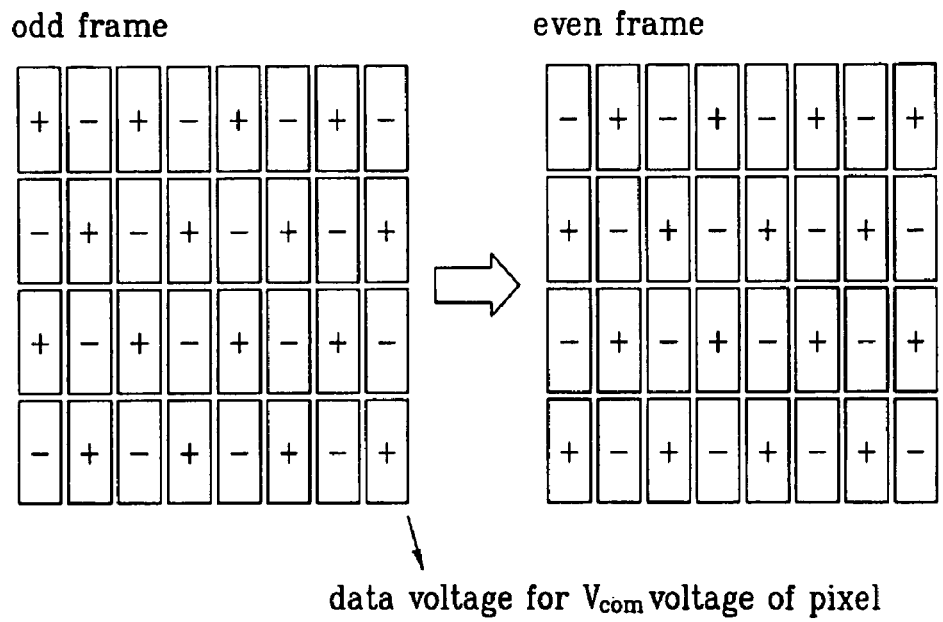
FIG. 7 is a polarity change diagram of common voltages in pixel regions according to odd/even frames of an In-Plane switching mode LCD device according to the related art.
Figure 8:
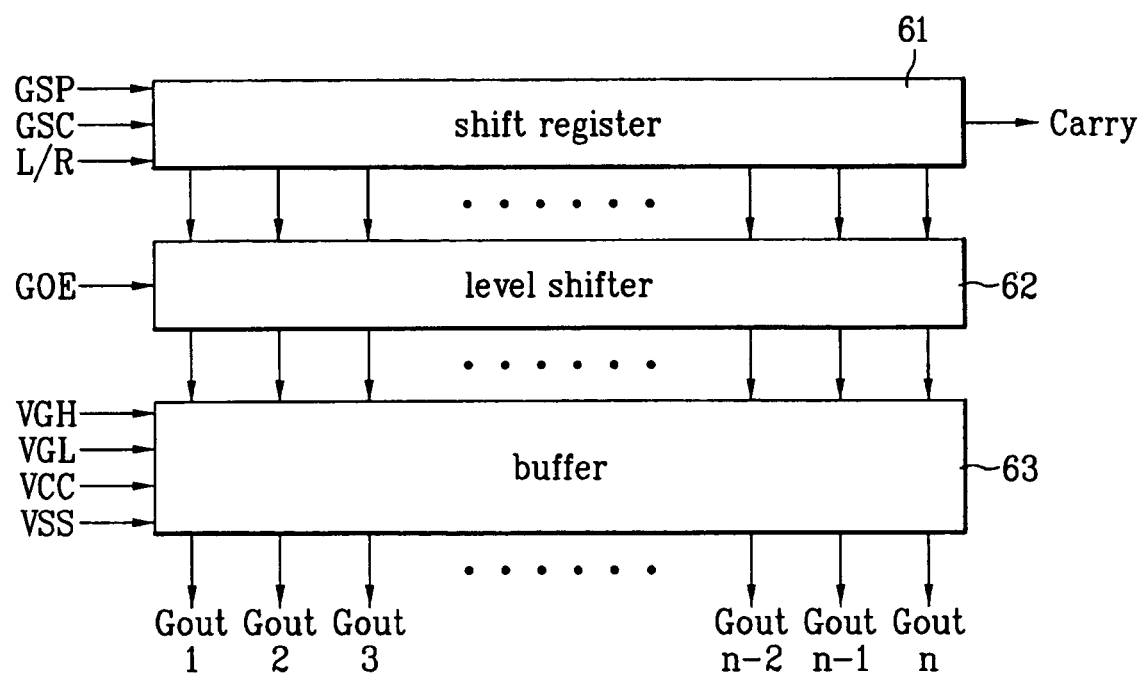
FIG. 8 is a block diagram of a gate driver of an In-Plane switching mode LCD device according to the related art.
Figure 9:
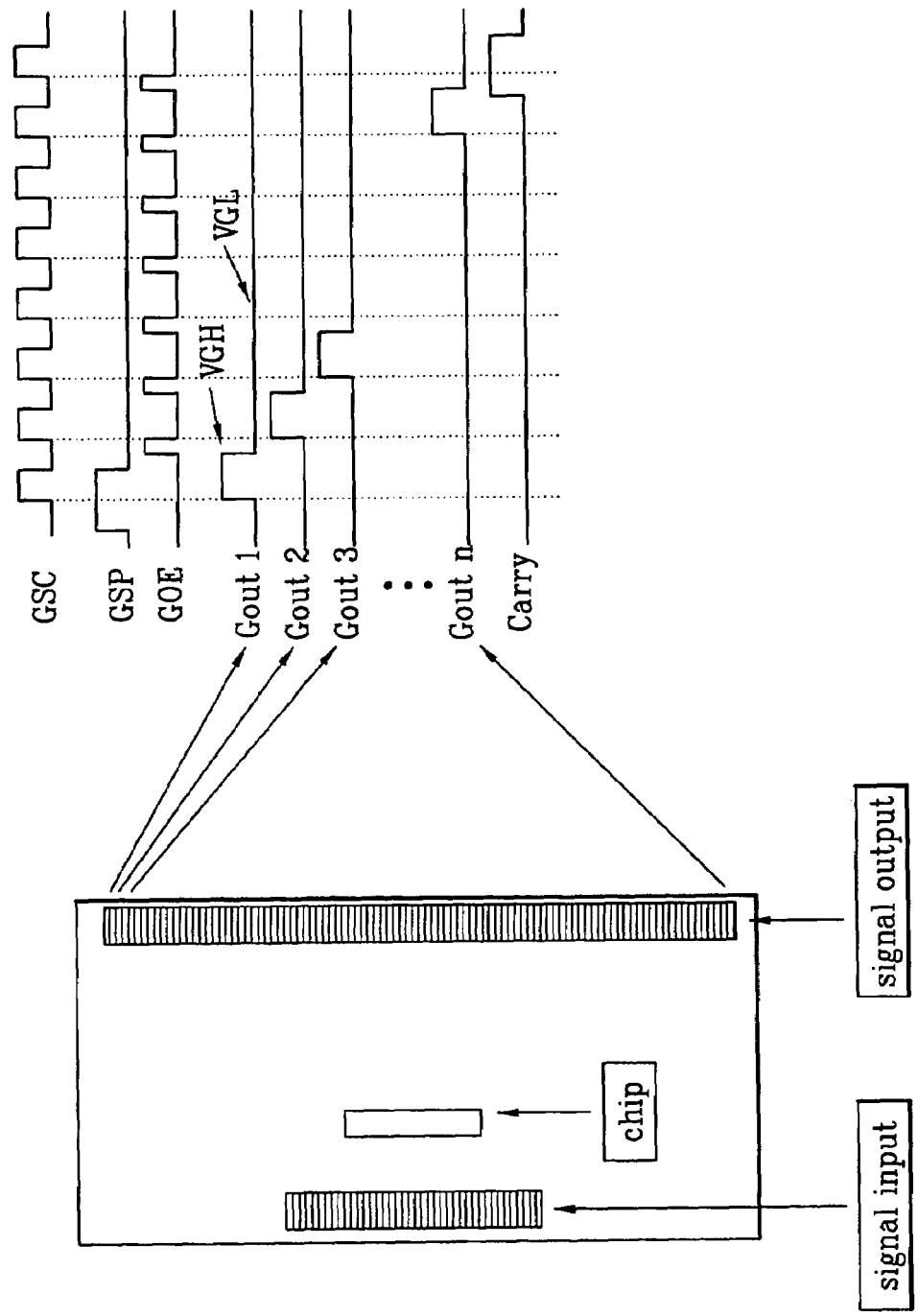
FIG. 9 is a diagram of a gate driver structure and a timing sequence of an In-Plane switching mode LCD device according to the related art.
Figure 10:
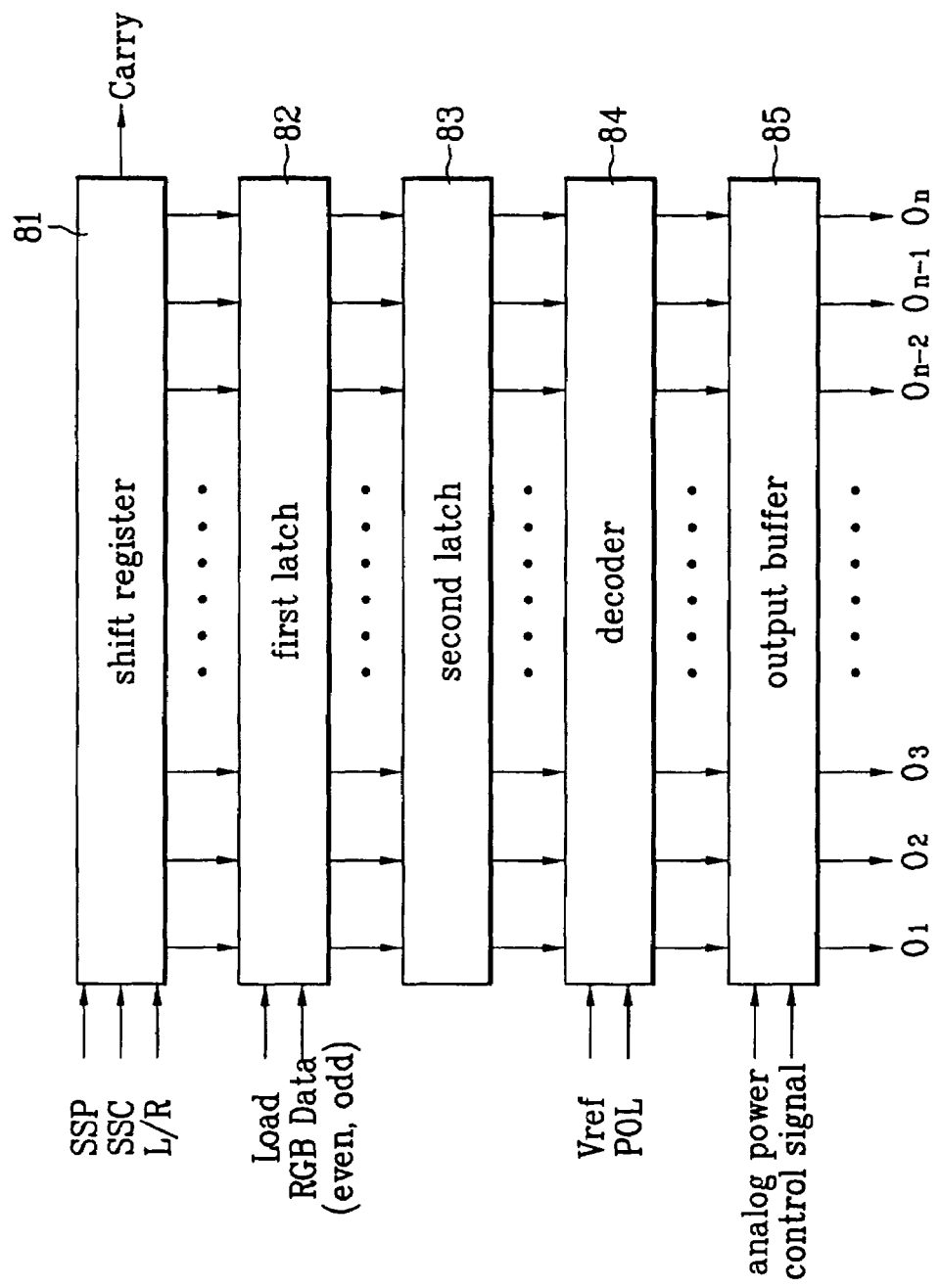
FIG. 10 is a block diagram of a source driver of an In-Plane switching mode LCD device according to the related art.
Figure 11:
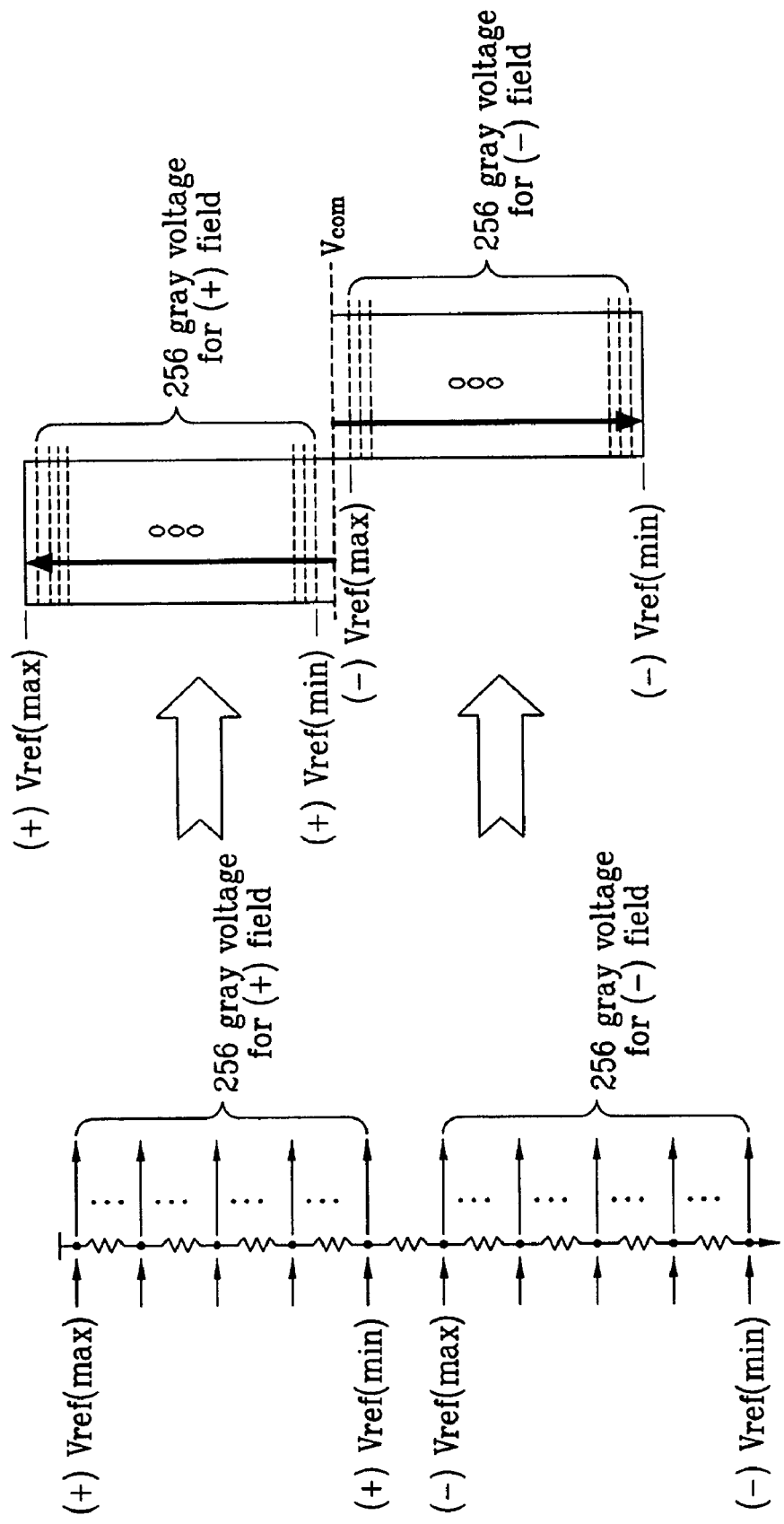
FIG. 11 is a gamma standard voltage circuit establishing a gamma standard voltage and a data voltage output extent of a source driver using the gamma standard voltage circuit according to the related art.
Figure 12:
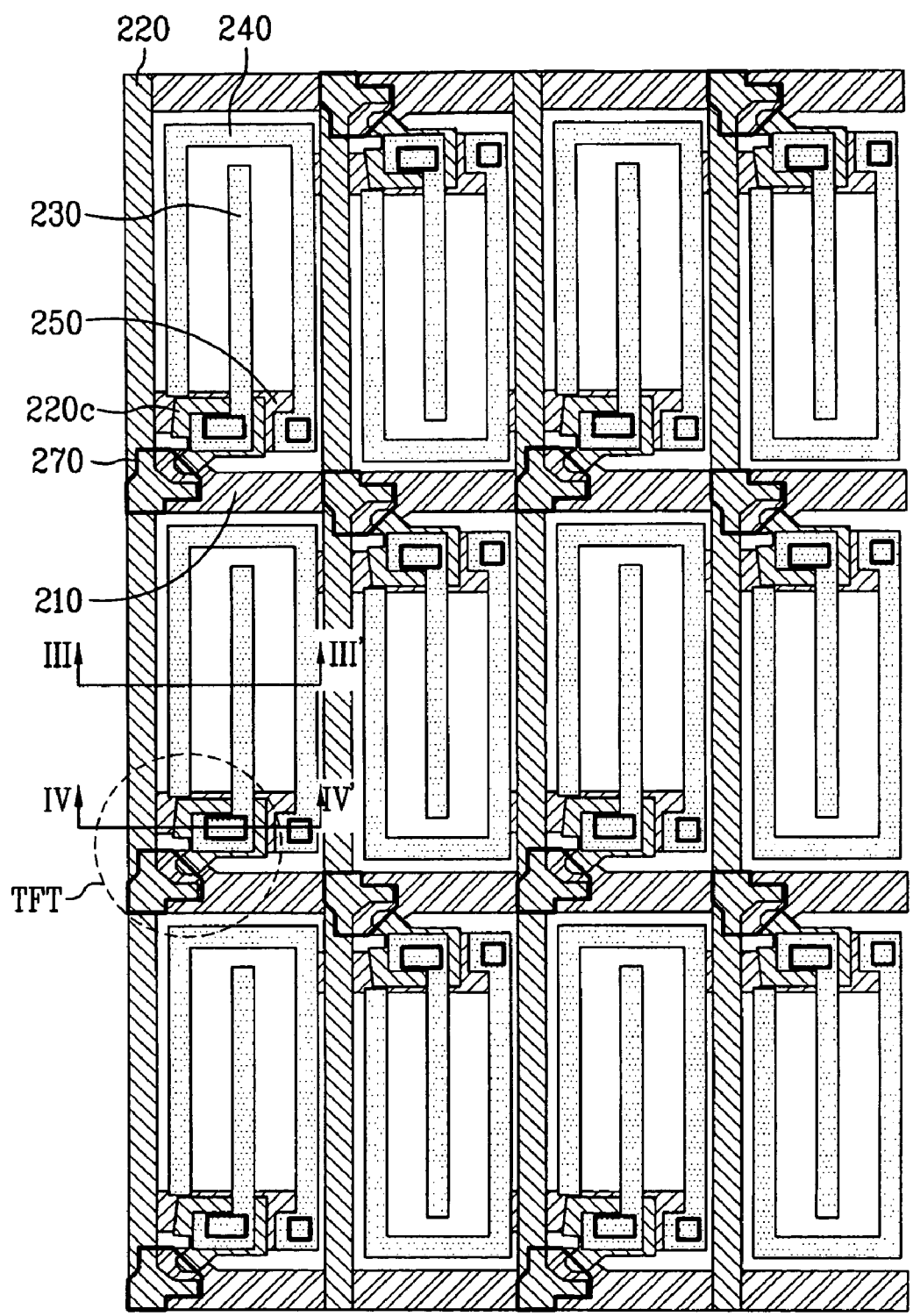
FIG. 12 is an exemplary pixel structure of an In-Plane switching mode LCD device according to the present invention.

FIG. 12 is an exemplary pixel structure of an In-Plane switching mode LCD device according to the present invention. In FIG. 12, an In-Plane switching mode LCD device may include a plurality of gate and data lines 210 and 220, a plurality of thin film transistors TFT, a plurality of pixel electrodes 230, a plurality of storage lines 250, and a plurality of common electrodes 240. Accordingly, the plurality of gate and data lines 210 and 220 may be formed to cross each other, thereby forming a plurality of pixel regions. The plurality of thin film transistors TFTs may be formed at the crossings of the gate and data lines and may be disposed at alternating positions at lower and upper side pixel regions adjacent to a corresponding gate line 210. In addition, the plurality of pixel electrodes 230 may be connected to drain electrodes 220c of the respective TFTs, and may be formed within the pixel regions in parallel with the data lines 200. The storage lines 250 may be formed in an offset configuration (i.e., zigzag pattern) in parallel with the gate lines 210 along the TFT regions, and the plurality of common electrodes 240 may be formed along a circumference of the pixel regions at fixed intervals from the pixel electrodes 230 to be connected to the storage lines 250.

In addition, the common electrode 240 may be disposed adjacent to the right side data line 220 of the pixel region and may overlap the storage line 250. The storage line 250 may include a first storage line and a second storage line. The first storage line may be formed parallel with the gate line 210 along the TFT regions, and the second storage line may be connected to the first storage line in parallel with the data line 220 to overlap the common electrode 240 along a right side of the pixel region. In addition, the first storage line may cross a left side data line 220 of the pixel region, and the drain electrode 220c of the TFT may overlap the storage line 250, thereby forming a storage capacitor.

Figure 13:
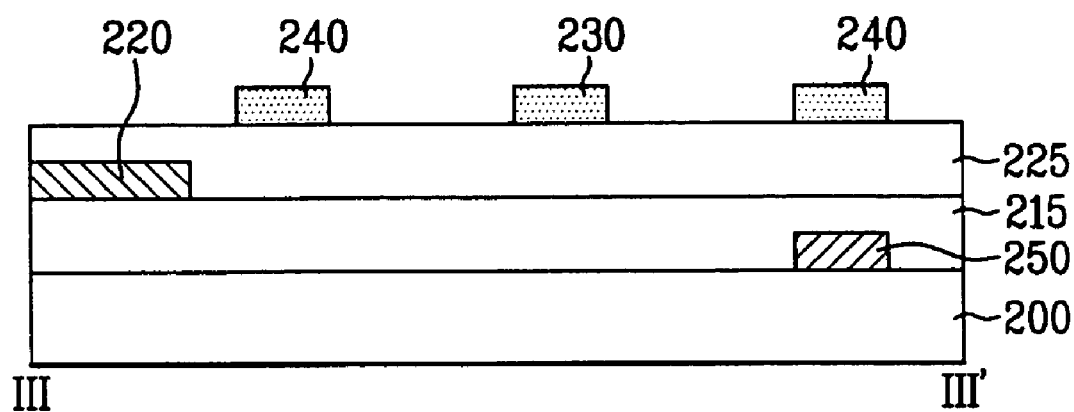
FIG. 13 is a cross sectional view along III-III' of FIG. 12 according to the present invention.
Figure 14:
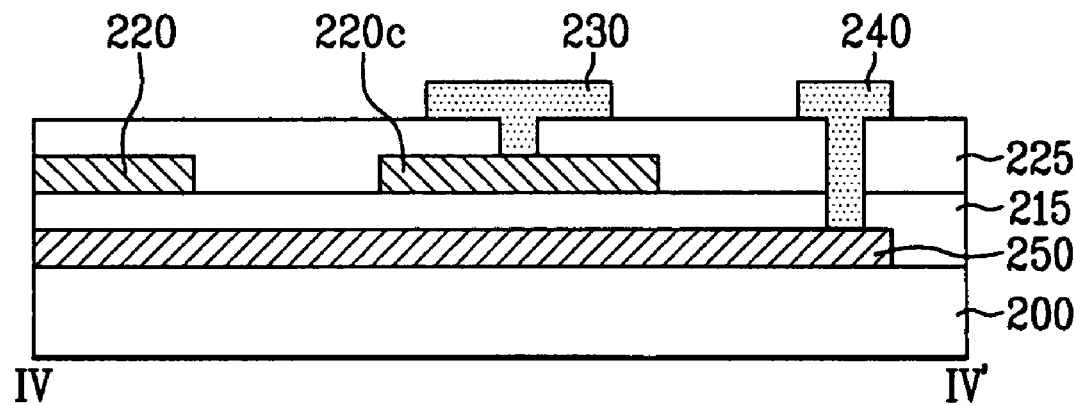
FIG. 14 is a cross sectional view along IV-IV' of FIG. 12 according to the present invention.

FIG. 13 is a cross sectional view along III-III' of FIG. 12 according to the present invention, and FIG. 14 is a cross sectional view along IV-IV' of FIG. 12 according to the present invention. In FIGS. 13 and 14, a metal layer may be deposited on an entire surface of a substrate 200 and selectively removed, thereby forming the gate line (210 in FIG. 12) and the storage line 250 spaced apart by a fixed interval from the gate line 210 along the same surface. In addition, gate electrodes may be alternately formed along lower and upper sides of adjacent pixels along a corresponding gate line 210. Moreover, the storage line 250 may be formed at a predetermined interval from the gate line 210 to overlap the drain electrode and the common electrode in an offset configuration (i.e., zigzag pattern). Subsequently, a gate insulating layer 215 may be formed on an entire surface of the substrate 200 including the gate line 210 and the storage line 250, and a semiconductor layer (270 in FIG. 12) may be formed on the gate insulating layer 215 above the gate electrode. Then, a metal layer may be deposited on an entire surface of the gate insulating layer 215, and then selectively removed to form the data line 220 perpendicular with the gate line 210 and source/drain electrodes 220c on the substrate 200. Accordingly, the TFT including the gate electrode, the semiconductor layer 270, and the source/drain electrodes 220c may be formed on the substrate 200.

Next, a passivation layer 225 may be formed on an entire surface of the substrate 200 including the data line 220. Then, the passivation layer 225 and the gate insulating layer 215 may be selectively removed, thereby forming contact holes corresponding to the drain electrode 220c and the storage line 250. Then, a metal layer may be deposited on an entire surface of the passivation layer 225, and then selectively removed, thereby forming the pixel electrode 230 and the common electrode 240 within the pixel region. Accordingly, the pixel electrode 230 may be connected to the drain electrode 220c of the TFT, and the common electrode 240 may be connected to the storage line 250 spaced apart from the pixel electrode 230 by the predetermined interval. In addition, the gate insulating layer 215 and the passivation layer 225 may be interposed between the drain electrode 220c of the TFT and the storage line 250, thereby forming the storage capacitor Cst (not shown).

Figure 15:
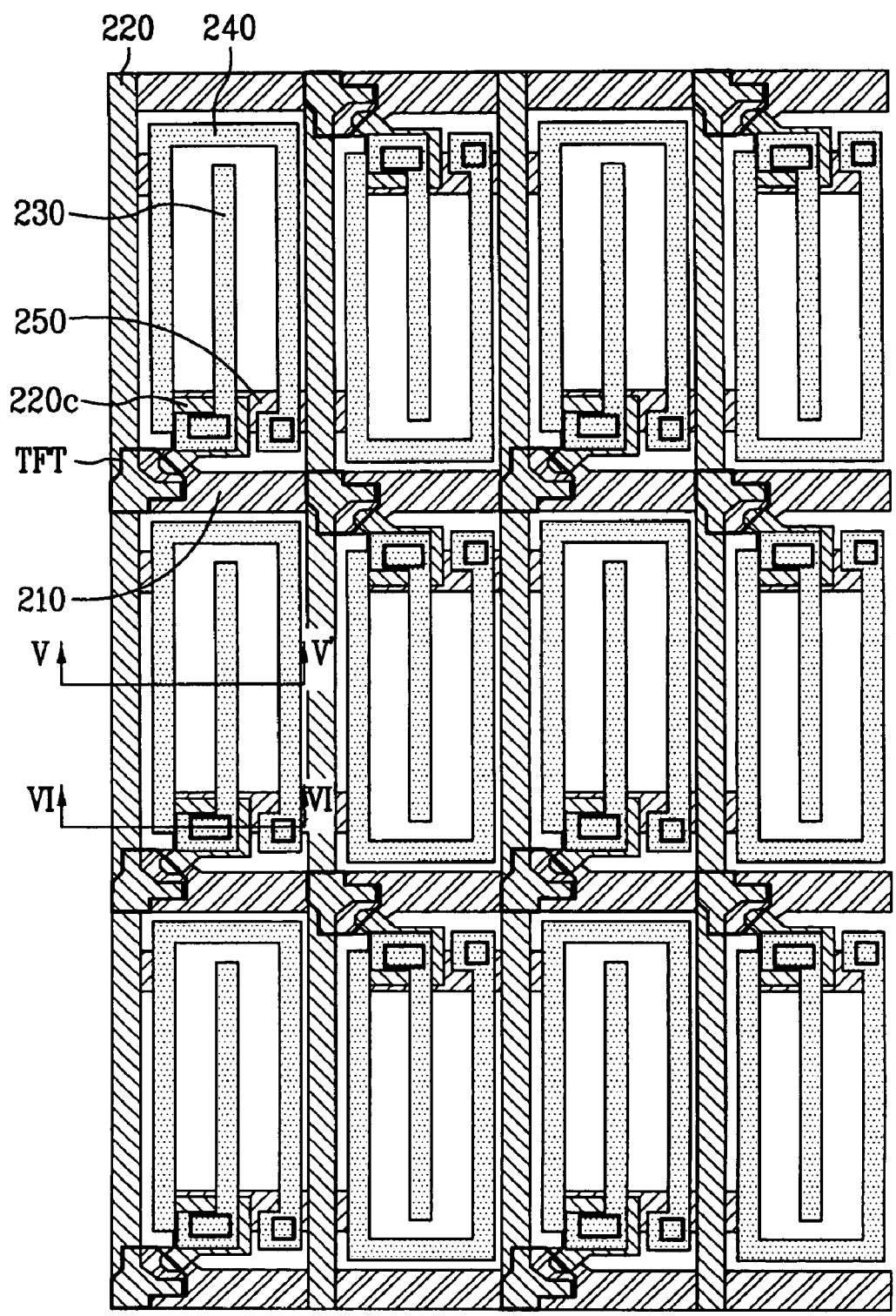
FIG. 15 is another exemplary pixel structure of an In-Plane switching mode LCD device according to the present invention.
Figure 16:
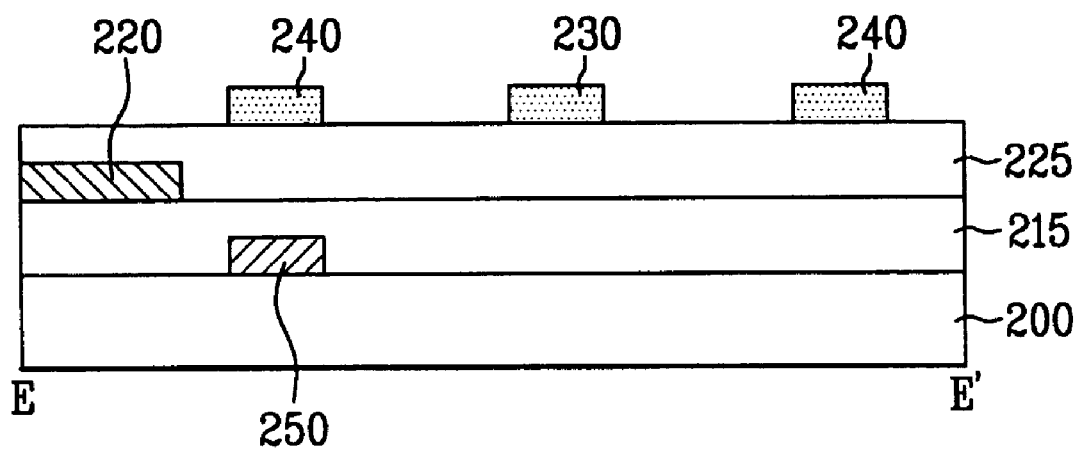
FIG. 16 is a cross sectional view along V-V' of FIG. 15 according to the present invention.
Figure 17:
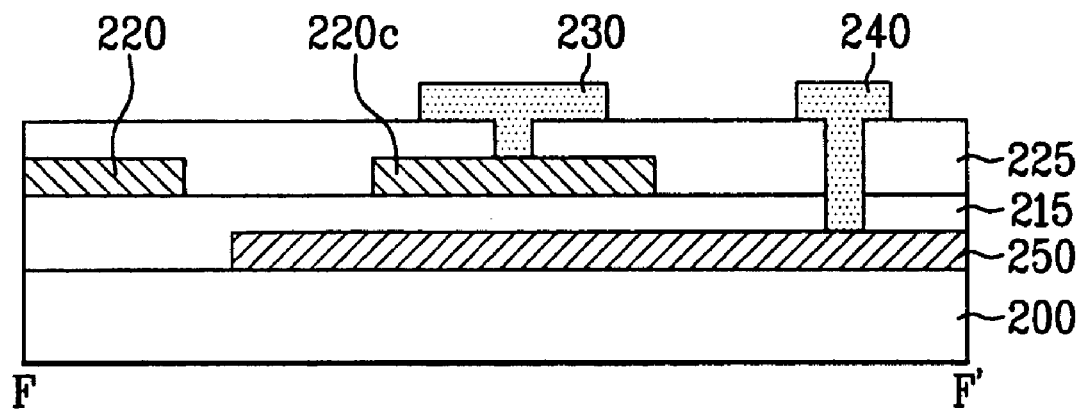
FIG. 17 is a cross sectional view along VI-VI' of FIG. 15 according to the present invention.

FIG. 15 is another exemplary pixel structure of an In-Plane switching mode LCD device according to the present invention, FIG. 16 is a cross sectional view along V-V' of FIG. 15 according to the present invention, and FIG. 17 is a cross sectional view along VI-VI' of FIG. 15 according to the present invention. In FIG. 15, an In-Plane switching mode LCD device may have a similar structure to the In-Plane switching mode LCD device of FIG. 12, except that a storage line 250 may be formed to overlap a common electrode 240 adjacent to a left side data line of a pixel region, and the storage line 250 may be formed to overlap a data line along a right side of the pixel region. Thus, like referenced numbers will be used to describe features common to FIGS. 12 and 15. In FIG. 15, a common electrode may be formed to overlap a storage line at a portion adjacent to a left side data line of a corresponding pixel region, wherein the storage line, which may be formed along a thin film transistor of a corresponding pixel region, may be elongated along the adjacent pixel region.

In FIGS. 15, 16, and 17, a pixel structure of an In-Plane switching mode LCD device may include a plurality gate and data lines 210 and 220, a plurality of thin film transistors TFTs, a plurality of pixel electrodes 230, a plurality of storage lines 250, and a plurality of common electrodes 240, wherein the plurality of gate and data lines 210 and 220 may be formed to cross each other, thereby forming a plurality of pixel regions. The plurality of thin film transistors TFTs may be formed the crossings of the gate and data lines to be alternately positioned along lower and upper side pixel regions adjacent the corresponding gate line 210. In addition, the plurality of pixel electrodes 230 may be connected to drain electrodes 220c of the respective TFTs, and may be formed within the pixel regions to be parallel with the data lines 220. The storage lines 250 may be formed in an offset configuration (i.e., zigzag pattern) to be parallel with the gate lines 210 along the TFT regions, and the plurality of common electrodes 240 may be formed along circumferential regions of the pixel regions spaced apart by fixed intervals from the respective pixel electrodes 230 to be connected to the storage lines 250. For example, the common electrode 240 adjacent to the left side data line 220 of the pixel region may be formed to overlap the storage line 250, wherein the storage line 250 may include a first storage line and a second storage line. The first storage line may be formed along the respective TFT regions to be parallel with the gate line 210, and the second storage line may be formed in parallel with the data line 220 to overlap the common electrode along the left side of the pixel region. In addition, the first storage line may be formed to cross the right side data line 220 of the pixel region.

In FIGS. 12-17, two windows may be formed between the common electrode and the pixel electrode within the pixel region. However, it is also possible to form four or six windows between the common electrode and the pixel electrode within the pixel region.

Figure 18:
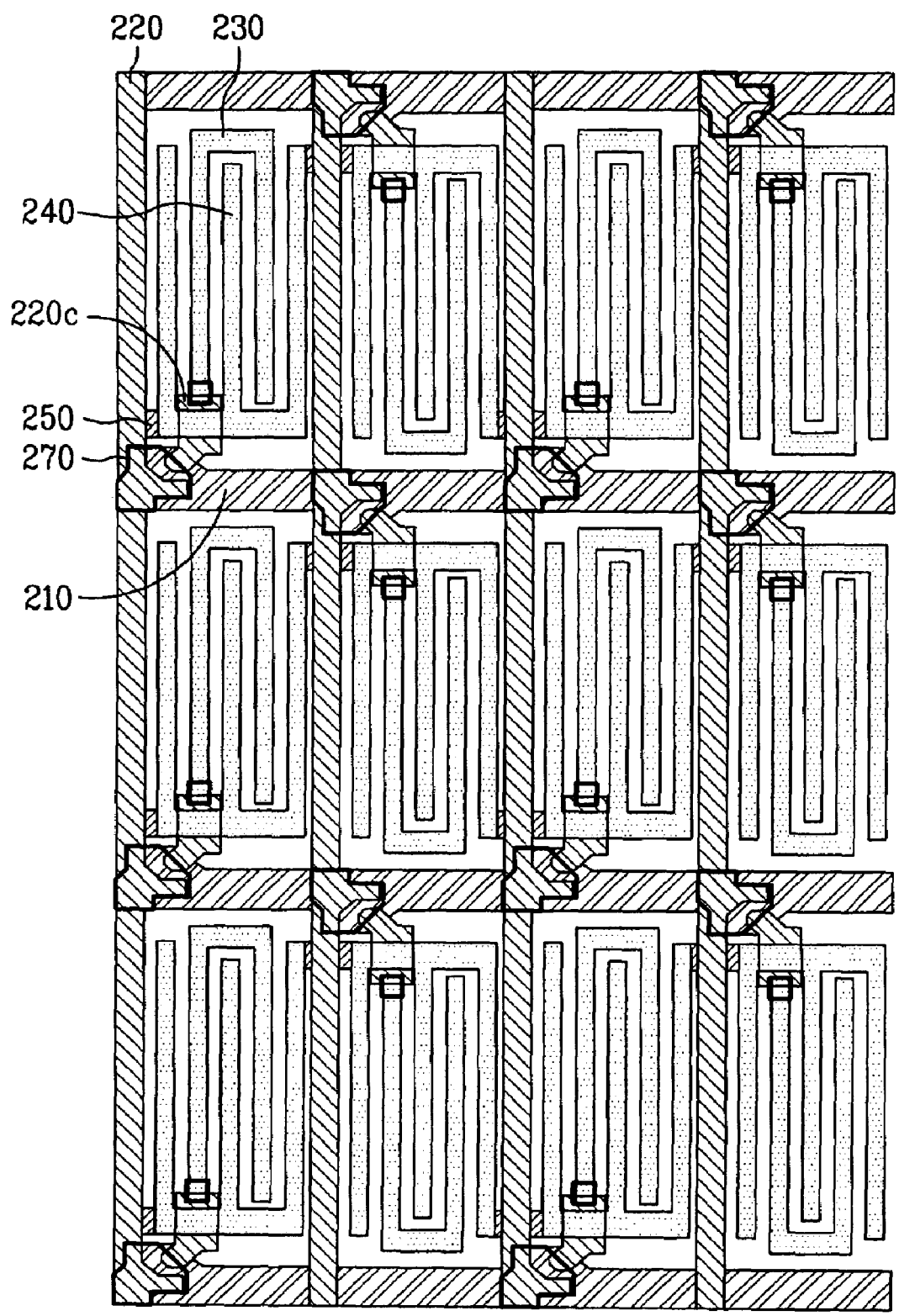
FIG. 18 is another exemplary pixel structure of an In-Plane switching mode LCD device according to the present invention.

FIG. 18 is another exemplary pixel structure of an In-Plane switching mode LCD device according to the present invention. In FIG. 18, an In-Plane switching mode LCD device may have similar structures as those of FIG. 12 except that four windows may be formed between a common electrode and a pixel electrode. Thus, like referenced numbers will be used to describe features common to FIGS. 12 and 18.

In FIG. 18, an In-Plane switching mode LCD device may include a gate line 210, a data line 220, a storage line 250, and a thin film transistor. In addition, a pixel electrode 230 may be connected with a drain electrode 220 of the thin film transistor in an inverted U-shape, and a common electrode 240 may be formed having fingered portions corresponding to the inverted U-shape of the pixel electrode 230 and may be spaced apart from the pixel electrode 230 by a constant interval.

Figure 19:
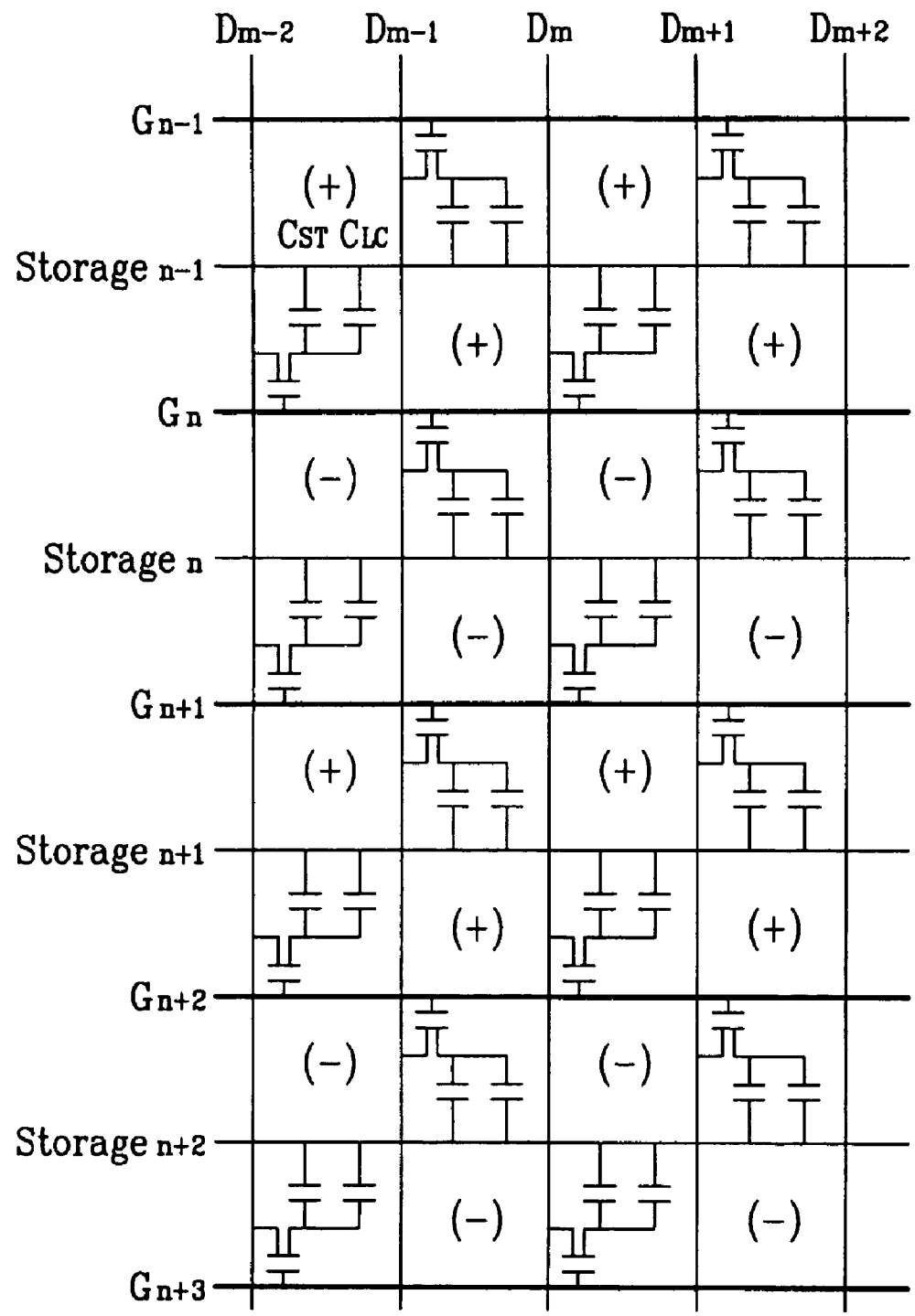
FIG. 19 is an exemplary circuit diagram of an In-Plane switching mode LCD device according to the present invention.
Figure 20:
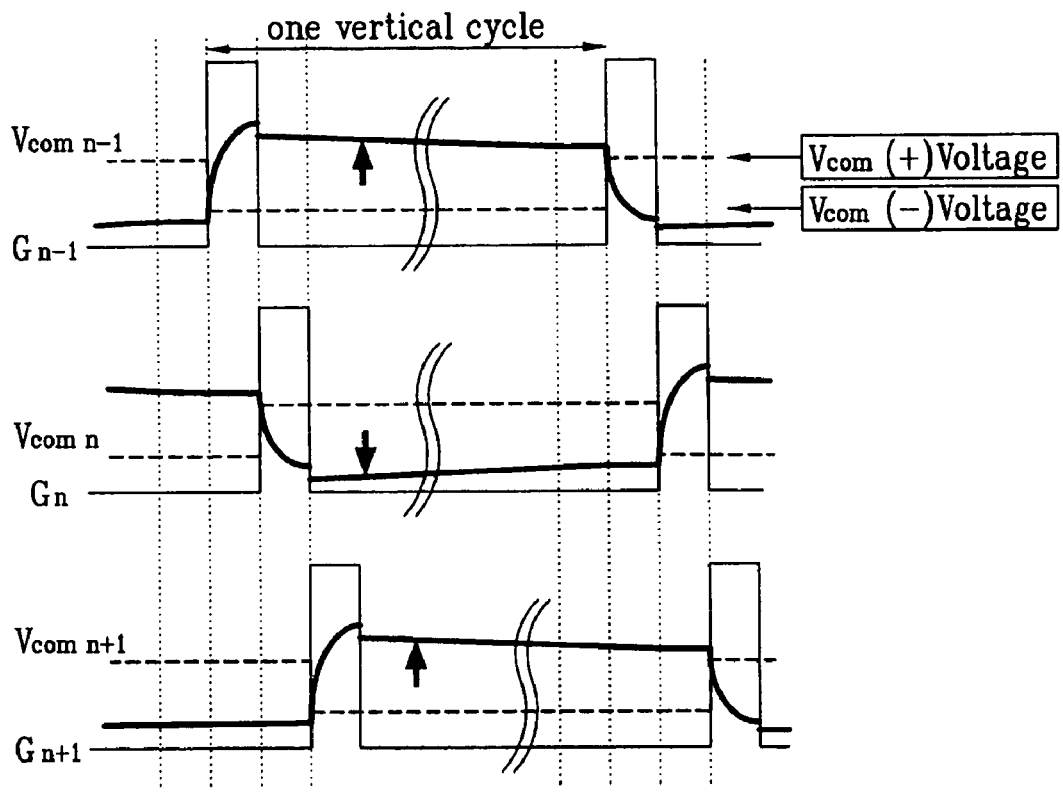
FIG. 20 is an exemplary timing diagram of a pixel voltage according to the present invention.

FIG. 19 is an exemplary circuit diagram of an In-Plane switching mode LCD device according to the present invention, and FIG. 20 is an exemplary timing diagram of a pixel voltage according to the present invention. In FIG. 19, any of the pixel structures of FIG. 12, 16, or 18 may be incorporated as the equivalent circuit diagram of FIG. 19, in which the storage lines are respectively interposed between the adjacent gate lines. For example, the pixel structure of the In-Plane switching mode LCD device may be formed of an n-th number of gate lines, an n-th number of data lines that cross the gate lines, an n-th number of storage lines, wherein each of the individual cells may include one of a first thin film transistor, a first storage capacitor Cst, and a first liquid crystal capacitor $C_{LC}$ and a second thin film transistor, a second capacitor Cst, and a second liquid crystal capacitor $C_{LC}$. Accordingly, the n-th numbered storage line may be formed between the n-th numbered gate line and the (n+1)-th numbered gate line, and the first thin film transistor may be formed at a crossing of the (n+1)-th numbered gate line and the m-th numbered data line. Thus, the first storage capacitor Cst and the first liquid crystal capacitor $C_{LC}$ may be formed between and parallel to the drain electrode of the first thin film transistor and the n-th numbered storage line. In addition, the second thin film transistor may be formed at a crossing of the n-th numbered gate line and the (m+1)-th numbered data line, and the second storage capacitor Cst and the second liquid crystal capacitor $C_{LC}$ may be formed between and parallel to the drain electrode of the second thin film transistor and the storage line. Thus, a first common voltage (or second common voltage) may be supplied to the odd-numbered storage lines, and a second common voltage (or first common voltage) may be supplied to the even-numbered storage lines, wherein the same polarity pixel voltage may be supplied to the pixel regions connected to the same storage line.

In the In-Plane switching mode LCD device, signals may be supplied to an LCD panel from a gate driver to supply the common voltages having different levels, and a general source driver in a dot inversion method, thereby obtaining a rapid response time. In addition, the storage lines may be driven in a line inversion method, so that the pixel region may be least effected by an electric field distortion from the adjacent pixel region, thereby obtaining improved electro-optic characteristics, such as black luminance.

The odd-numbered storage lines may be synchronized by one scanning signal supplied to the corresponding gate line, and the even-numbered storage lines may be synchronized by the other scanning signal supplied to the corresponding gate line, thereby supplying the same level first common voltage Vcom(−) or same level second common voltage Vcom(+) to the odd- or even-numbered storage lines. Upon changing to a next frame, the first common voltage Vcom(−) supplied to one storage line may be level-shifted to the second common voltage Vcom(+), and the second common voltage Vcom(+) supplied to the other storage line may be level-shifted to the first common voltage Vcom(−). For example, the first and second common voltage signals Vcom(−) and Vcom(+) may be alternately supplied to the corresponding storage line according to the data voltage supplied from the source driver (not shown). In addition, the liquid crystal capacitor $C_{LC}$ and the storage capacitor Cst may be formed in parallel to be alternately positioned along lower and upper side pixel regions adjacent to the corresponding storage line "Storage n." Accordingly, the same polarity pixel voltage supplied to a liquid crystal material may be alternately supplied to the lower and upper side pixel regions adjacent to the corresponding storage line "Storage n." Thus, in the In-Plane switching mode LCD device, the common voltages Vcom(−)/Vcom(+) may be supplied to the corresponding storage line in the line inversion method, and the respective pixels may be driven according to the dot inversion method changing the polarity of the pixel voltage.

If the respective storage lines "Storage n" in the offset configurations of any of FIG. 12, 15, or 18 are formed as an equivalent circuit diagram of FIG. 19 to be parallel to the respective gate lines Gn, the TFTs may be alternately positioned along lower and upper side pixel regions adjacent to the corresponding gate line Gn. In addition, the liquid crystal capacitor $C_{LC}$ and the storage capacitor $C_{ST}$ may be formed between and parallel to the drain electrode of the TFT and the storage line "Storage n." Accordingly, as shown in FIG. 19, when a positive(+) polarity data voltage is supplied to one pixel, the first common voltage Vcom(−) may be supplied to the corresponding storage line, and the first common voltage Vcom(−) may be induced in the common electrode connected to the corresponding storage line. In addition, when a negative(−) polarity data voltage is supplied to one pixel, the second common voltage Vcom(+) may be supplied to the corresponding storage line, and the second common voltage (+) may be induced in the common electrode connected to the corresponding storage line. For example, the first common voltage Vcom(−) of the low level may be supplied to the (n−1)-th numbered storage line "Storage n-1", wherein "n" is a positive number, of a cell to which the positive (+) polarity data voltage may be supplied, and the second common voltage Vcom(+) of the high level may be supplied to the n-th numbered storage line "Storage n" of a cell to which the negative (−) polarity data voltage may be supplied. Accordingly, a voltage difference is increased between the pixel electrode and the common electrode.

In the In-Plane switching mode LCD, the common electrode and the pixel electrode may be formed along the same plane, thereby generating an In-Plane mode electric field. As shown in FIG. 20, the pixel voltage value may be influenced by a scanning signal supplied to the gate line and a common voltage signal supplied to the storage line. Accordingly, the pixel voltage value of the pixel region may be the difference between the data voltage and the common voltage, which may be greater than at least a difference (Vcom(+)-Vcom(−)) between the first and second common voltage values Vcom (−) and Vcom(+). Thus, the first and second common voltages are differently set according to the polarity of the pixel region, thereby increasing a margin of the applied data voltage. In addition, it may be possible to narrow an extended amount of output of the source driver supplying the data voltage to the data line.

Figure 21:
FIG. 21 is an exemplary polarity change diagram in pixel regions according to odd/even frames of an In-Plane switching mode LCD device according to the present invention.

FIG. 21 is an exemplary polarity change diagram in pixel regions according to odd/even frames of an In-Plane switching mode LCD device according to the present invention. As shown in FIG. 21, since TFTs and storage lines may be formed in an offset configuration (i.e., zigzag pattern), the polarity may be same along a horizontal direction of an LCD display panel even though opposite polarity data voltages may be supplied to adjacent pixels. For example, the positive (+) and negative (−) polarity data voltages may be alternately supplied to the pixels of along a vertical direction, and the same polarity data voltage may be supplied to the pixels along a horizontal direction, thereby driving the LCD display panel at a high speed and obtaining high-quality images.

In FIG. 21, the first and second common voltages having different levels may be supplied to the respective storage lines. Accordingly, the same polarity pixel voltage may be generated in the pixel regions corresponding to the same storage line, wherein the adjacent storage lines may have polarities different from each other. In addition, signals may be supplied to an LCD display panel from a gate driver supplying the common voltages having different levels, and a general source driver in a dot inversion method, thereby obtaining a rapid response time. Moreover, the storage lines may be driven in a line inversion method, so that the pixel region has the least influence by an electric field distortion from an adjacent pixel region, thereby obtaining improved electro-optic characteristics, such as black luminance.

Figure 22:
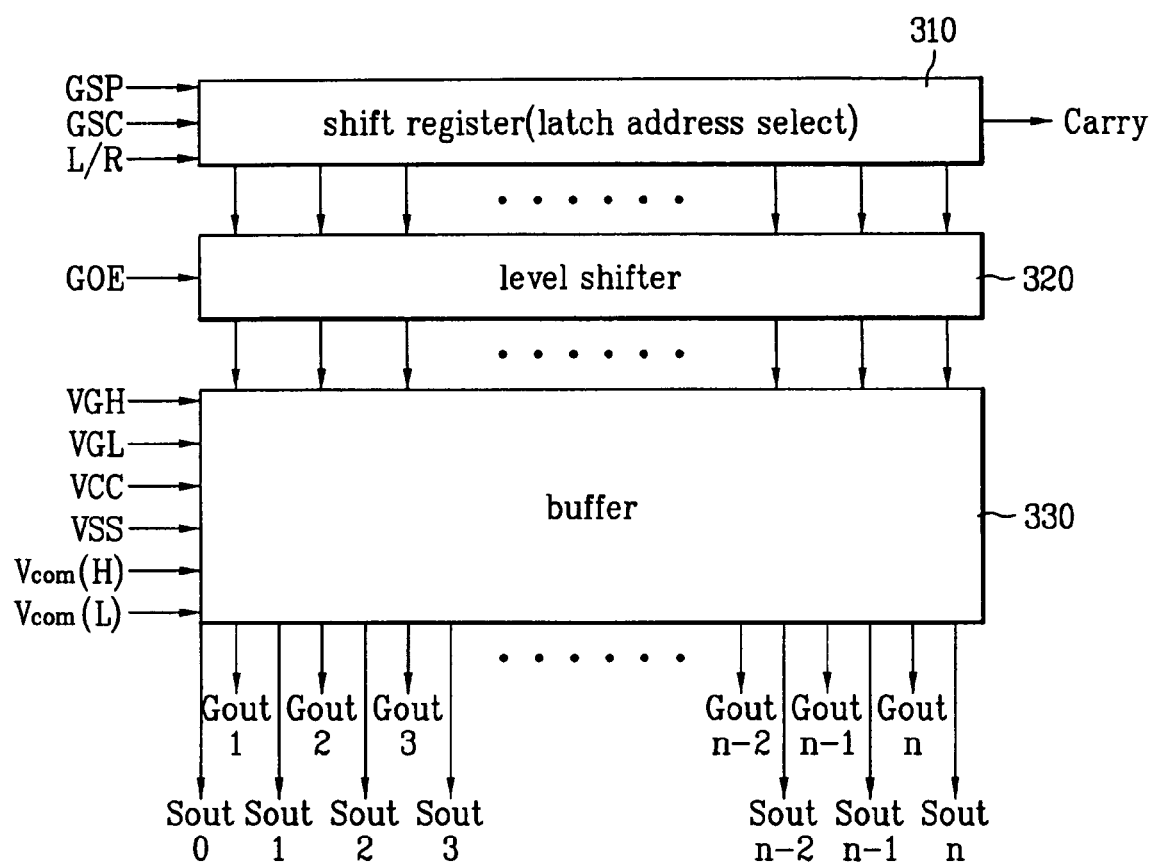
FIG. 22 is an exemplary block diagram of a gate driver of an In-Plane switching mode LCD device according to the present invention.

FIG. 22 is an exemplary block diagram of a gate driver of an In-Plane switching mode LCD device according to the present invention. In FIG. 22, a gate driver of an In-Plane switching mode LCD device may include a shift register part 310, a level shifter 320, and a buffer 330. The shift register part 310 may include a plurality of shift registers that receive a Gate Start Pulse signal (GSP), a Gate Shift Clock signal (GSC), and a Left/Right select signal (L/R) from a processor (not shown), whereby the plurality of shift registers may be sequentially operated. In addition, the level shifter 320 may receive a Gate Output Enable signal (GOE) from the processor for sequentially shifting signal levels output from the shift register part 310. The buffer 330 may receive a high level VGH, a low level VGL, a first power source voltage Vcc, a second power source voltage Vss, and first and second common voltages from the processor, and then the buffer 330 may become synchronized with the signal output from the level shifter 320. Thus, the buffer 330 may output scanning signals Gout1, Gout2, . . . , and Goutn to respective gate lines, and first and second common voltages Sout0, Sout1, Sout2, . . . , and Soutn to respective storage lines.

Figure 23:
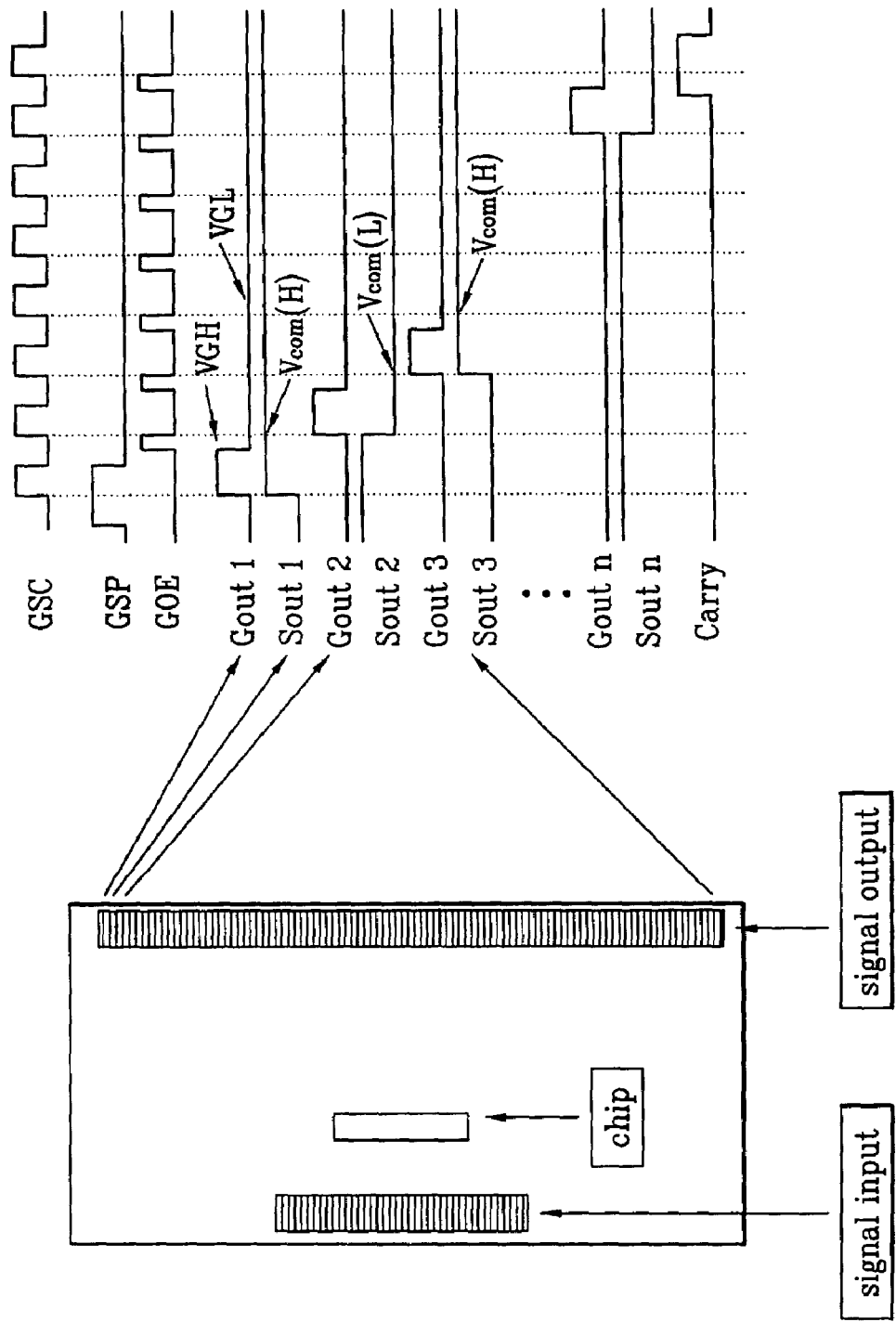
FIG. 23 is an exemplary diagram of the gate driver structure of FIG. 22 and timing sequence of an In-Plane switching mode LCD device according to the present invention.

FIG. 23 is an exemplary diagram of the gate driver structure of FIG. 22 and timing sequence of an In-Plane switching mode LCD device according to the present invention. An operation of the gate driver will be described with reference to FIGS. 22 and 23, wherein the shift register part 310 may shift the GSP signal by the GSC signal, thereby sequentially enabling the gate lines. After completing enabling of the gate lines in one frame, a carry value may be carried so that the gate lines of the next frame are enabled. Subsequently, the level shifter 320 may sequentially level-shift the signals supplied to the gate lines, and may output the level-shifted signals to the buffer 330. Accordingly, the plurality of gate lines connected to the buffer 63 may be sequentially enabled. In addition, a predetermined gate line synchronized by the GSC signal may be maintained at the high level VGH state, and then the predetermined gate line may be synchronized with a rising edge of the GOE signal to drop to the low level VGL. When supplying the right R select signal, the gate driver may be operated as mentioned above. Meanwhile, when the left L select signal is supplied to the gate driver, the signal may be supplied to the gate lines and the storage lines in reverse order.

A method for driving the In-Plane switching mode LCD device having the aforementioned gate driver according to the present invention will be described as follows. First, the source driver (not shown) may sequentially receive video data of respective pixels from the processor, thereby storing video data corresponding to the data lines. Then, the gate driver may output the GSC signal, the GSP signal, and the GOE signal, thereby sequentially supplying the scanning signals to the plurality of gate lines. Accordingly, the plurality of TFTs connected to the selected gate line may be turned ON, thereby supplying the video data (data voltage state) stored in the shift register of the source driver to the drain electrode. Accordingly, the video data may be displayed on the LCD display panel. Then, the aforementioned operation may be repeated to display the video data on the LCD display panel. For example, the gate driver may receive the GSP signal from the processor, and then may be synchronized with the GSC signal, thereby outputting the scanning signal Goutn. Then, the gate driver may sequentially output the scanning signal Goutn of the high level VGH by shifting of the GSP signal. Accordingly, when the shift register value is set as a low value by the GOE signal, the scanning signal Goutn is output as the low level VGL voltage. The storage line signals Soutn output from an output pin for the adjacent storage line are the first and second common voltages (high and low levels) having the different levels from each other. On outputting the corresponding scanning signal Goutn, the level of the corresponding storage line Soutn signal is inverted, and then output.

Although not shown, the In-Plane switching mode LCD device may require the source driver having a narrowed output extension of the data voltage supplied to the data line. That is, the pixel voltage supplied to a liquid crystal material may be the difference between the data voltage and the common voltage. In addition, the common voltage may be classified into two values. Specifically, the pixel voltage may be set as the difference between the high-level data voltage and the low-level common voltage (first common voltage) or the difference between the low-level data voltage and the high level common voltage (second common voltage). Thus, it may be possible to obtain low power consumption by the source driver. Accordingly, the voltage of the source driver may be output such that the pixel voltage value for one positive (+) field may be lower than the pixel voltage value for one negative (−) field, or the pixel voltage value for the negative (−) field may be higher than the pixel voltage value for the positive (+) field.

In the In-Plane switching mode LCD device using the source and gate drivers, the picture image may be displayed using the horizontal line inversion method. Thus, the pixel voltage may be simultaneously output as the positive (+) and negative (−) field voltages, thereby obtaining high-quality images. In addition, the data may be output using a line memory for outputting the data in an offset configuration (i.e., zigzag pattern). Furthermore, compensation data may be formed along the lowest and uppermost horizontal portions for non-signal. That is, a dummy line may be additionally formed to store the compensation data.

Figure 24:
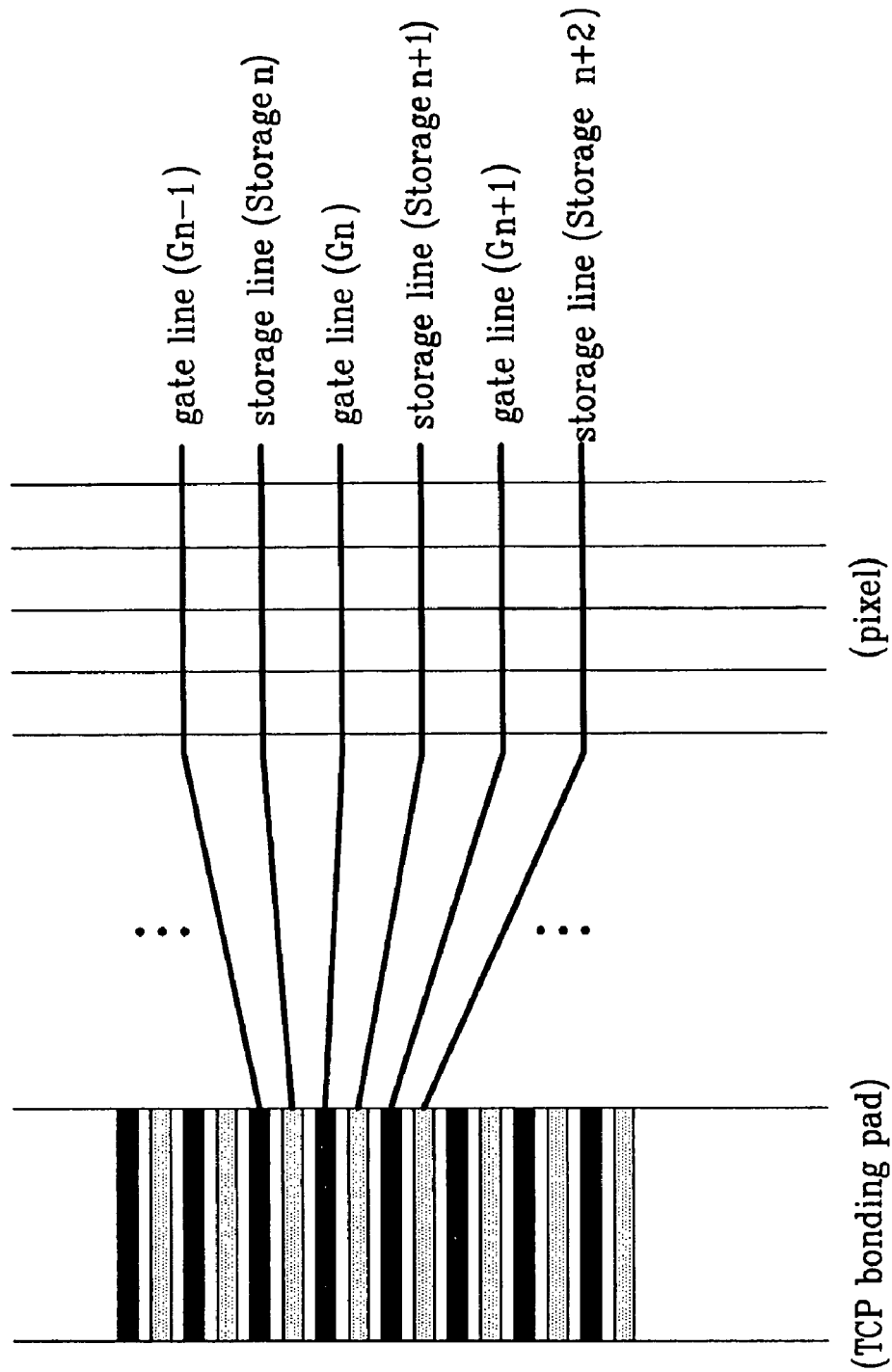
FIG. 24 is an exemplary schematic diagram of connections between the TCP bonding pad of FIG. 23 and a panel connected to the TCP bonding pad according to the present invention.

FIG. 24 is an exemplary schematic diagram of connections between the TCP bonding pad of FIG. 23 and a panel connected to the TCP bonding pad according to the present invention. In FIG. 24, the gate driver may be connected to the signal lines of the LCD display panel using the TCP bonding pad. The TCP bonding pad may be positioned along a circumference of the LCD display panel to supply the scanning signal to the gate line of the LCD display panel. Accordingly, the LCD display panel may include the storage line disposed between the gate lines, and the gate driver of the driver for supplying the signals to the respective gate lines and storage lines. Thus, the output side of the gate driver may be positioned within the TCP bonding pad, and a storage line signal supply pin may be positioned between gate line supply pins to correspond to the storage line.

Figure 25:
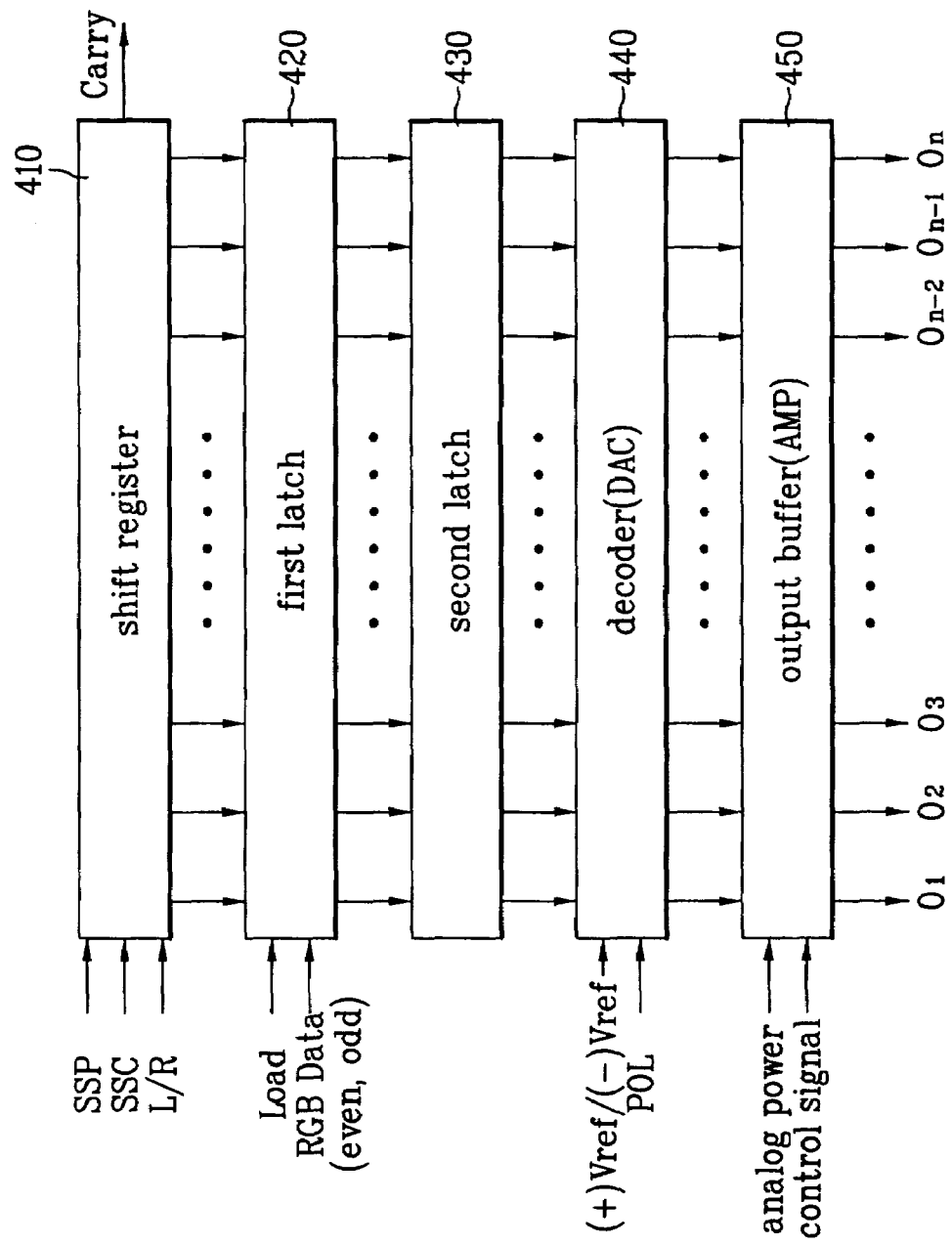
FIG. 25 is an exemplary block diagram of a source driver of an In-Plane switching mode LCD device according to the present invention.

FIG. 25 is an exemplary block diagram of a source driver of an In-Plane switching mode LCD device according to the present invention. In FIG. 25, a source driver of an In-Plane switching mode LCD device may include a shift register 410, first and second latch parts 420 and 430, a decoder 440, and an output buffer 450. In addition, the shift register 410 may receive a Source Start Pulse signal (SSP), a Source Shift Clock signal (SSC), and a Left/Right select signal (L/R) from a processor (not shown), and then the shift register 410 may store the signal according to respective addresses. Moreover, the first and second latch parts 420 and 430 may receive a Load signal from the processor to receive and store RGB Data signals for even/odd modes in the corresponding addresses. The decoder DAC 440 may convert digital signals stored in the first and second latch parts 420 and 430 into analog signals, and the output buffer 450 may output the respective signals of the decoder 440 according to the corresponding data lines.

The decoder 440 may use a gamma standard voltage circuit established by an additional circuit for a positive (+) field gamma standard voltage (+)Vref and a negative (−) field gamma standard voltage (−)Vref. Specifically, the source driver may be operated as follows. The RGB Data signals may be sequentially received from the processor through the shift register 410 in a dot clock, and then latched by the first and second latch parts 420 and 430, thereby changing a timing system of Dot at a Time Scanning to a timing system of Line at a Time Scanning. Then, the data signals stored in the first latch part 420 may be transmitted to the second latch part 430 along a vertical direction according to a horizontal line by a transfer enable signal. The data signals stored in the second latch part 430 may be transmitted to the decoder DAC 440, wherein the decoder DAC 440 may receive a gamma standard voltage and may respond to a Polarity Out Load (POL) signal supplied from the processor, whereby the digital data may be converted into an analog voltage, and then the analog voltage may be output. Subsequently, the analog voltage may be supplied to the respective data lines through the output buffer 450 according to a control signal supplied from the analog power source and processor.

Figure 26:
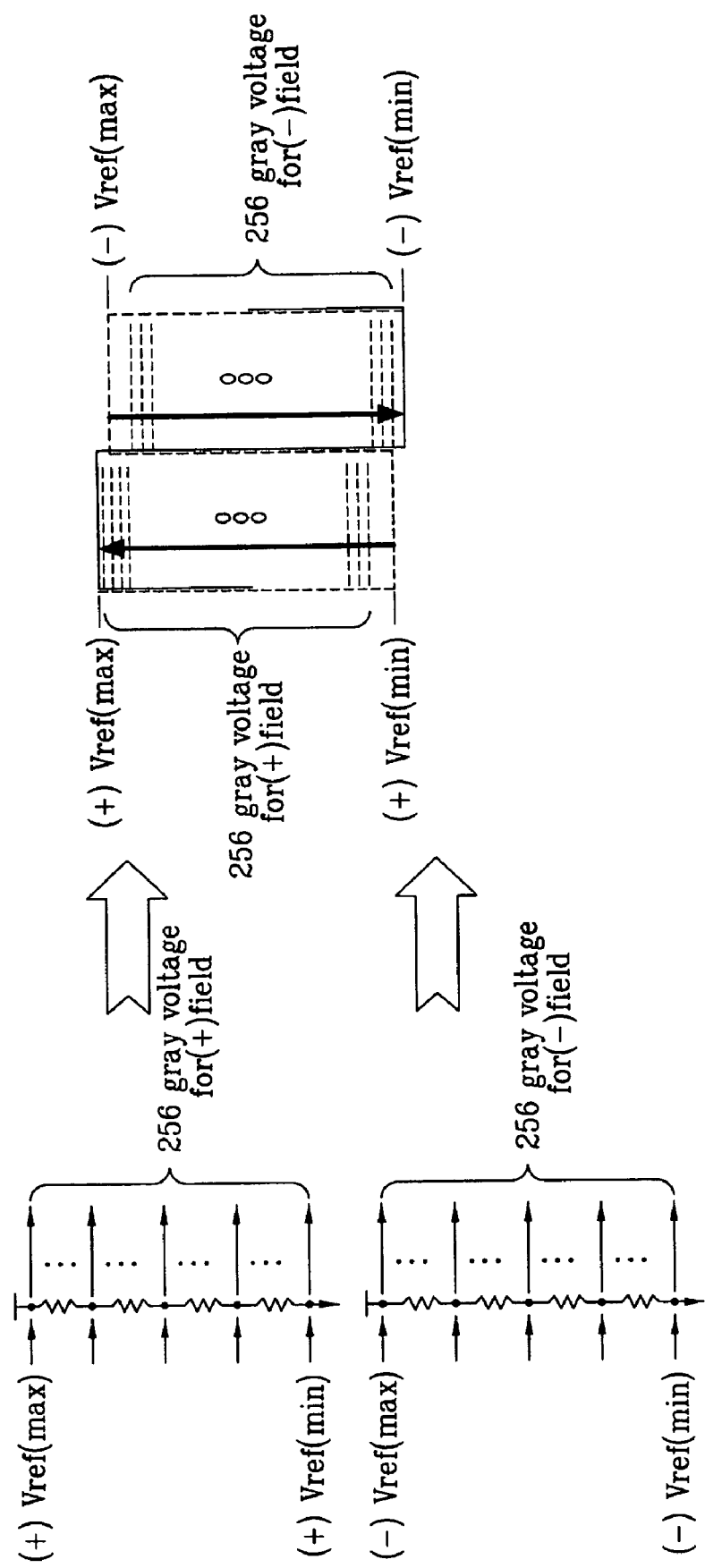
FIG. 26 is an exemplary gamma standard voltage circuit establishing a gamma standard voltage and a data voltage output extent of a source driver using the gamma standard voltage circuit according to the present invention.

FIG. 26 is an exemplary gamma standard voltage circuit establishing a gamma standard voltage and a data voltage output extent of a source driver using the gamma standard voltage circuit according to the present invention. In FIG. 26, in order to obtain 256 gray levels, a source driver of an In-Plane switching mode LCD device forms 256 gray voltage levels for positive (+) fields and 256 gray voltage levels for negative (−) fields with an additional gamma voltage driving circuit. The 256 gray voltage levels for the positive (+) fields may use an R-string method, in which the gamma standard voltage for the positive (+) fields may be set between a maximum standard voltage for the positive (+) field (+)Vref(max) and a minimum standard voltage for the positive (+) field (+)Vref(min). In the same way, the 256 gray voltage levels for the negative (−) fields may use an R-string method, in which the gamma standard voltage for the negative (−) fields may be set between a maximum standard voltage for the negative (−) field (−)Vref(max) and a minimum standard voltage the negative (−) field (−)Vref(min).

Herein, the source driver is operated according to the gamma standard voltage from the DAC 440. The source driver outputs the data voltage of the 256 gray voltage levels for the positive (+) fields and 256 gray voltage levels for the negative (−) fields. At this time, the extended output of the 256 gray voltage levels for the positive (+) fields may partially overlap with the extended output of the 256 gray voltage levels for the negative (−) fields, whereby the gamma standard voltage value of the positive (+) field may be lower than the gamma standard voltage value of the negative (−) field. Accordingly, the extended output of the source driver may be totally decreased since the extended output of the 256 gray voltage levels for the positive (+) fields may partially overlap with the extended output of the 256 gray voltage levels for the negative (−) fields, whereby it may be possible to decrease the power consumption when using the source driver according to the present invention.

As mentioned above, the In-Plane switching mode LCD device according to the present invention has the following advantages. First, when the positive (+) polarity data voltage is supplied to one pixel, the first common voltage Vcom(−) is supplied to the corresponding storage line and the common electrode. Meanwhile, when the negative (−) polarity data voltage is supplied to one pixel, the second common voltage Vcom(+) is supplied to the corresponding storage line and the common line. As a result, the voltage difference decreases between the pixel electrode and the common electrode, thereby relatively decreasing the power consumption by decreasing the change width of the output voltage in the source driver.

Furthermore, the gate driver alternately supplies the first and second common voltages having the different polarities to the adjacent storage lines, and the source driver is driven in the dot inversion method having the data output signal polarity, whereby it is possible to supply the pixel voltage of the high level to the liquid crystal material.

In addition, it may be possible to increase the pixel voltage value in the In-Plane switching mode LCD device according to the present invention, so that an aperture ratio increases by increasing the interval between the pixel electrode and the common electrode. As a result, a luminance is improved.

In the In-Plane switching mode LCD device according to the present invention, the positive (+) and negative (−) output voltages of the source driver are simultaneously output in the same way as the general dot inversion method. Meanwhile, the pixel voltages of the same polarity is positioned at the substantial gate line direction, so that the pixel region has the least effect of electric field distortion from the adjacent pixel region, thereby obtaining improved electro-optic characteristics, such as the black luminance.

In addition, the general source/gate drivers of the dot inversion driving method are used in the In-Plane switching mode LCD device according to the present invention, so that it is possible to decrease horizontal and vertical crosstalk, thereby obtaining the high-quality image.

It will be apparent to those skilled in the art that various modifications and variations can be made in the in-plane switching mode liquid crystal display device and method of fabricating the same of the present invention. Thus, it is intended that the present invention covers the modifications and variations of this invention provided they come within the scope of the appended claims and their equivalents.

What is claimed is:

1. An In-Plane switching mode LCD device, comprising:
   a plurality of gate and data lines crossing each other to define a plurality of pixel regions;
   a plurality of thin film transistors (TFTs) formed at crossing points of the gate and data lines to be alternately positioned along lower and upper side pixel regions adjacent to corresponding gate lines;
   a plurality of storage lines to be parallel with the gate lines, each storage line being separated, wherein the storage line includes a first storage line parallel with the gate line along the TFTs, and a second storage line connected to the first storage line in parallel with the data line;
   a plurality of pixel electrodes within the pixel regions to be connected to drain electrodes of the TFTs; and
   a plurality of common electrodes disposed at fixed intervals from the pixel electrodes and connected to the storage lines,
   wherein a high-level first common voltage and a low-level second common voltage are alternatively supplied to adjacent storage lines.

2. The device according to claim 1, wherein the first and second common voltages are inversely supplied to corresponding storage lines when a frame is changed.

3. The device according to claim 1, wherein the high-level first common voltage and the low-level second common voltage are synchronized with a gate pulse applied to the gate line corresponding to the storage line.

4. The device according to claim 1, further comprising a dummy line disposed along the lowermost portion of the horizontal gate line or the uppermost portion of the horizontal gate line.

5. The device according to claim 1, wherein the drain electrode of the TFT overlaps the storage line to form a storage capacitor.

6. The device according to claim 1, wherein the storage line is formed along a circumferential portion of the pixel region to be parallel with one of an adjacent gate and data line.

7. The device according to claim 6, wherein the storage line is formed along a corresponding thin film transistor in parallel with the gate line to be elongated to adjacent pixel regions by crossing the data line along one side of the pixel region.

8. The device according to claim 1, wherein the common electrode at least partially overlaps with the storage line.

9. The device according to claim 8, wherein the common electrode overlaps with the storage line at the common electrode portion adjacent to the data line within the pixel region.

10. The device according to claim 1, wherein the second storage line overlaps with the common electrode along a right side of the pixel region, and the first storage line crosses a left-side data line of the pixel region.

11. The device according to claim 1, wherein the second storage line overlaps with the common electrode along the left side of the pixel region, and the first storage line crosses the right-side data line within the pixel region.

12. The device according to claim 1, wherein the storage line is formed on the same layer as the gate line.

13. The device according to claim 12, wherein the storage line is formed of the same material as the gate line.

14. The device according to claim 1, wherein the pixel electrode is formed in a center portion of the pixel region, and the common electrode is formed along a circumferential portion of the pixel region at a predetermined interval from the pixel electrode.

15. The device according to claim 1, wherein the pixel electrode is formed in parallel with the data line.

16. The device according to claim 1, further comprising a gate driver for alternately supplying first and second common voltages Vcom(+)/Vcom(−) to odd- and even-numbered storage lines, and for supplying a gate driving voltage to the gate lines.

17. The device according to claim 16, wherein the gate driver includes:
   a shift register receiving a Gate Start Pulse signal GSP, a Gate Shift Clock signal GSC, and a Left/Right select signal L/R from a processor for shifting the GSC signal and outputting the shifted GSC signal;
   a level shifter receiving a Gate Output Enable signal GOE from the processor for sequentially shifting signal levels output from the shift register in response to the GOE signal, and outputting the shifted signal level; and
   a buffer receiving a high level VGH, a low level VGL, and first and second common voltages Vcom(+)/Vcom(−) from the processor,
   wherein the buffer is synchronized with the signal output from the level shifter to output scanning signals to the gate lines and first and second common voltages to the storage lines.

18. The device according to claim 17, wherein the shift register receives the Left/Right select signal L/R from the processor to perform a both-side shifting function.

19. The device according to claim 17, wherein the buffer alternately supplies the high-level first common voltage and the low-level second common voltage to the storage line corresponding to the gate line when supplying the scanning signal to the gate line.

20. The device according to claim 16, wherein an output terminal of the gate driver further includes a storage line signal supply pin disposed between gate line signal supply pins for supplying the signals to the gate lines.

21. The device according to claim 20, wherein the output terminal of the gate driver further includes two pins for a dummy line at lowermost or uppermost portion of the gate line signal supply pins.

22. The device according to claim 1, further comprising:
   a gate driver for sequentially scanning signals to the gate lines, and alternately supplying the low and high level common voltages to the storage lines; and
   a source driver for supplying the data voltage for negative fields to the data line of the pixel to which the high level common voltage is supplied, and for supplying the data voltage for positive fields to the data line of the pixel to which the low level common voltage is supplied.

23. The device according to claim 22, wherein the positive field is a data voltage value being larger than value of the low level common voltage, and the negative field is a data voltage value being smaller than a data voltage value of the high level common voltage.

24. The device according to claim 22, wherein the source driver outputs the data voltage for one of the positive fields and the data voltage for one of the negative fields with a gamma standard voltage circuit established by an additional circuit.

25. The device according to claim 22, wherein the source driver includes:

- a shift register receiving a Source Start Pulse signal SSP, a Source Shift Clock signal SSC, and a Left/Right select signal L/R from a processor and stores the signals according to respective addresses;
- first and second latch parts receiving a Load signal from the processor to receive and store RGB Digital Data signals for even/odd modes in corresponding addresses;
- a decoder DAC receiving gamma standard voltages according to one of the positive fields and the negative fields for changing digital signals stored in the first and second latch parts into analog signals; and
- an output buffer outputting the respective signals of the decoder according to corresponding data lines.

26. The device according to claim 25, wherein the decoder receives the gamma standard voltages for the positive fields and the negative fields according to a Polarity Out Load (POL) level supplied from the processor.

27. The device according to claim 1, wherein the plurality of storage lines disposed in an offset configuration to be parallel with the gate lines along the TFTs.

* * * * *